United States Patent
Jiang et al.

(10) Patent No.: US 10,655,064 B2
(45) Date of Patent: May 19, 2020

(54) LIQUID CRYSTAL COMPOSITION AND ITS APPLICATION

(71) Applicants: Tianmeng Jiang, Beijing (CN); Huiqiang Tian, Beijing (CN); Shihong Chu, Beijing (CN); Haiguang Chen, Beijing (CN); Lilong Gao, Beijing (CN); Quanzhi Ban, Beijing (CN); Xianli Liang, Beijing (CN)

(72) Inventors: Tianmeng Jiang, Beijing (CN); Huiqiang Tian, Beijing (CN); Shihong Chu, Beijing (CN); Haiguang Chen, Beijing (CN); Lilong Gao, Beijing (CN); Quanzhi Ban, Beijing (CN); Xianli Liang, Beijing (CN)

(73) Assignee: BEIJING BAYI SPACE LCD TECHNOLOGY CO., LTD, Beijing (CN)

( * ) Notice: Subject to any disclaimer, the term of this patent is extended or adjusted under 35 U.S.C. 154(b) by 204 days.

(21) Appl. No.: 15/120,113

(22) PCT Filed: Jul. 25, 2014

(86) PCT No.: PCT/CN2014/083002
§ 371 (c)(1),
(2) Date: Jul. 18, 2017

(87) PCT Pub. No.: WO2015/192441
PCT Pub. Date: Dec. 23, 2015

(65) Prior Publication Data
US 2017/0313939 A1   Nov. 2, 2017

(30) Foreign Application Priority Data
Jun. 17, 2014 (CN) .......................... 2014 1 0269923

(51) Int. Cl.
| C09K 19/12 | (2006.01) |
| C09K 19/34 | (2006.01) |
| C09K 19/30 | (2006.01) |
| C09K 19/20 | (2006.01) |
| C09K 19/44 | (2006.01) |
| C09K 19/02 | (2006.01) |
| C09K 19/04 | (2006.01) |

(52) U.S. Cl.
CPC ...... *C09K 19/3402* (2013.01); *C09K 19/0208* (2013.01); *C09K 19/20* (2013.01); *C09K 19/30* (2013.01); *C09K 19/3003* (2013.01); *C09K 19/3066* (2013.01); *C09K 19/44* (2013.01); *C09K 2019/0466* (2013.01); *C09K 2019/122* (2013.01); *C09K 2019/123* (2013.01); *C09K 2019/301* (2013.01); *C09K 2019/3004* (2013.01); *C09K 2019/3016* (2013.01); *C09K 2019/3019* (2013.01); *C09K 2019/3021* (2013.01); *C09K 2019/3025* (2013.01); *C09K 2019/3027* (2013.01); *C09K 2019/3422* (2013.01)

(58) Field of Classification Search
CPC ....................................................... C09K 19/12
See application file for complete search history.

(56) References Cited

U.S. PATENT DOCUMENTS

2014/0166931 A1* 6/2014 Goto ...................... C09K 19/12
252/299.61

FOREIGN PATENT DOCUMENTS

| CN | 101747904 A | 6/2010 | |
| TW | 201333174 A | 8/2013 | |
| WO | WO-9213928 A1 | 8/1992 | |
| WO | WO-9921815 A1 | 5/1999 | |
| WO | WO-2013122011 A1 * | 8/2013 | ............. C09K 19/12 |

OTHER PUBLICATIONS

International Search Report and Written Opinion dated Jan. 26, 2015 in corresponding PCT Application No. PCT/CN2014/083002.

* cited by examiner

*Primary Examiner* — Chanceity N Robinson
(74) *Attorney, Agent, or Firm* — Harness, Dickey & Pierce, P.L.C.

(57) ABSTRACT

The present invention provides a novel liquid crystal material composition comprising one or more compound, in order to achieve the properties of low viscosity, high resistivity, good low-temperature mutual solubility, fast response, excellent transmission, and which can be used for a variety of fast response display modes. Since the working temperature of a LCD material is subjected to the temperature range of individual LC molecules, information can only be displayed in a specific temperature range of the specific liquid crystal macro-alignment phase. At low temperature, the viscosity of liquid crystal increases exponentially, which in turn substantially reduces the response speed and overall performances of the display system. The liquid crystal composition according to the present invention overcomes these problems with balanced chemical composition by achieving low viscosity, good low-temperature performance and excellent transmission in a wide range of LCD applications including TN, IPS or FFS displays, thus improving display performance.

11 Claims, No Drawings

LIQUID CRYSTAL COMPOSITION AND ITS APPLICATION

CROSS-REFERENCE TO RELATED APPLICATIONS

This application is a 371 U.S. National Stage of International Application No. PCT/CN2014/083002, filed Jul. 25, 2014, which claims the benefit of Chinese Patent Application No. 201410269923.7, filed Jun. 17, 2014. The disclosures of the above applications are incorporated herein by reference.

FIELD OF THE INVENTION

The present invention relates to liquid crystal materials, particularly to the use of liquid crystal compositions for liquid crystal display devices.

BACKGROUND OF THE INVENTION

Currently, liquid crystal has been applied in information display and some progress has been made in optical communication (S. T. Wu, D. K. Yang. Reflective Liquid Crystal Displays. Wiley, 2001). In recent years, applications of liquid crystal compounds have significantly broadened to various types of display devices, electro-optical devices, electronic components, sensors and the like. For these purposes, a plurality of different structures has been proposed, particularly in nematic phase liquid crystals. Nematic phase liquid crystal compound so far has been widely used in flat panel displays, especially in thin film transistor (TFT) active matrix liquid crystal display (AMLCD) systems.

It has been a long path of development since the discovery of liquid crystals. In 1888, Friedrich Reinitzer, an Austrian botanist, discovered the first liquid crystal material, i.e., cholesteryl benzoate. Manguin invented a rubbing orientation for the production of single domain liquid crystal and initiated the research on optical anisotropy in 1917. E. Bose established Swarm doctrine in 1909, which was supported by experiments of L. S. Ormstein and F. Zernike et al (1918) and later was explained as statistical fluctuations by De Gennes. In 1933, G. W. Oseen and H. Zocher founded continuum theory which was modified by F. C. Frank later in 1958. M. Born (1916) and K. Lichtennecker (1926) found and studied liquid crystal dielectric anisotropy respectively. In 1932, W. Kast accordingly divided the nematic phase into positive and negative two categories. In 1927, V. Freedericksz and V. Zolinao discovered that nematic liquid crystal would be deformed and presented a voltage threshold (Freederichsz change) in the electric field or magnetic field. The discovery provides a basis for liquid crystal displays.

In 1968, R. Williams in Radio Corporation of America (RCA) found that nematic phase liquid crystals formed domain structure and had light scattering phenomenon in the electric field. G. H. Heilmeir then developed a dynamic scattering mode, the first liquid crystal display in the world. In the early 1970s, Helfrich and Schadt invented twist-nematic (TN) principle. The combination of the TN photoelectric effect and integrated circuit made a display device (TN-LCD), which has opened up a broad prospect for the application of liquid crystals. Since then, due to the development of large scale integrated circuits and the advancement of liquid crystal material, the liquid crystal display, in the art, has made a breakthrough. Super Twist Nematic (STN) mode was proposed successively by T. Scheffer et al. in 1983 through 1985 and an AMLCD mode proposed by P. Brody in 1972 were re-adopted. Conventional TN-LCD technology has been transferred to STN-LCD and TFT-LCD technologies. Although STN scanning lines can be up to 768 lines, there are still some shortcomings such as response speed, viewing angle and gray scale when the temperature rises. Therefore, for a large panel, high information content, high color quality display, an active matrix display becomes the first choice. TFT-LCD has been widely used in direct-view TV, large-screen projection television, computer monitor and certain military instrument display. It is believed that TFT-LCD technologies will have even broader applications.

There are two types of "active matrix" structures: firstly, metal oxide semiconductor (MOS) on a silicon wafer as the substrate. Secondly, thin film transistor (TFT) fabricated on a glass substrate.

Monocrystalline silicon as the substrate has a limitation with its display size due to the fact that there were many problems at junctions of each part of the display unit or module assembly. Accordingly, the second type of TFT active matrix is promising. The photoelectric display effect is generally TFT-TN mode. TFT substrate includes a compound semiconductor, such as of CdSe, a polycrystalline silicon as well as amorphous silicon.

For small and medium-size displays such as monitors and smart phones, the in-plane switching (IPS) and fringe field switching (FFS) mode is very interesting for its large viewing angle compared with TFT-TN display. With respect to the IPS, FFS has a higher transmittance. The liquid crystal mixture of those displays lies in the compounds with positive dielectric anisotropy, and optionally, neutral compounds.

It is desirable that the LCs inside the display cell structure should have the following advantages:
1. wide temperature range of nematic phase (in particular, low-temperature range)
2. fast response time (outdoor use, automobiles, avionics) switching at very low temperatures
3. superior resistance to UV radiation (longer service life)
4. low threshold voltage (to save energy)
5. high transmittance.

SUMMARY OF THE INVENTION

The present invention is directed to synthesizing liquid crystals for TN, ADS, FFS or IPS display applications. In particular, the liquid crystal medium should have a fast response time and a low rotational viscosity while having a high birefringence. The liquid crystal media should also have a high clearing point, and a suitable dielectric anisotropy.

It is discovered that the above-mentioned performances can be achieved by using a liquid crystal mixture comprising one or more compounds of formula I. The novel compound is characterized by a higher clearing point, better mutual solubility, more stable, while its physical parameters such as optical anisotropy, dielectric anisotropy and rotational viscosity are moderate adjustable. By combining with other suitable liquid crystal compounds, excellent overall electro-optical performances have already been achieved.

Specifically the present invention provides a liquid crystal composition comprising:
a) 1 to 90 weight percents of one or more compounds represented by the general formula I;
b) 1 to 85 weight percents of one or more compounds represented by the general formula II to III;
c) at most 80 weight percents of one or more compounds represented by the general formula IV to XIII;

d) at most 30 weight percents of one or more compounds represented by the general formula XIV to XVI;

e) at most 30 weight percents of one or more compounds represented by the general formula XVII to XXI;

f) at most 15% of one or more compounds represented by the general formula XXII to XXV;

wherein the above a) to f) sum to 100%;

$$R\text{-}A_1\text{-}Z_1\text{-}A_2\text{-}Z_2\text{-}A_3\text{-}Z_3\text{-}A_4\text{-}Z_4\text{-}A_5\text{-}O(CH_2)nF \quad \text{I}$$

wherein,

R is selected from H and unsubstituted or substituted alkyl or alkoxy containing 1 to 12 carbon atoms, one or more $CH_2$ groups thereof being independently replaced by —C≡C—, —$CF_2O$—, —CH=CH—, —O—, —CO—O—, —O—CO— in a manner of not directly being bonded each other to oxygen atoms, and one or more H atoms thereof being replaced by halogen;

$A_1$, $A_2$, $A_3$, $A_4$ and $A_5$ are each independently selected from a single bond; 1,3-cyclopentylene, 1,4-cyclohexylene, 1,4-cyclohexenyl; 1,4-piperidine group; 1,4-bicyclo [2.2.2] octyl; 1,4-phenylene, naphthalene-2,6-diyl; trans-decalin-2,6-diyl; tetrahydronaphthalene-2,6-diyl; indan; indene; phenanthrenyl and dibenzofuran; 1,4-cyclohexylene, one or two nonadjacent $CH_2$ thereof being replaced by O or S; 1,4-phenylene, one or two nonadjacent CH being replaced by N; and hydrogen may independently be substituted with halogen in each case; while $A_1$, $A_2$, $A_3$, $A_4$ and $A_5$ cannot be all a single bond;

$Z_1$, $Z_2$, $Z_3$ and $Z_4$ are each independently selected from a single bond, —$(CH_2)_2$—, —$(CH_2)_4$—, —CH=CHCH$_2$CH$_2$—, —CH$_2$CH$_2$CH=CH—, $CF_2O$, $OCF_2$, $CF_2CF_2$, CF=CF, $CH_2CF_2$, $CF_2CH_2$, $OCF_2CF_2O$, $C_2H_1CF_2O$, $CH_2CF_2OCH_2$, $CH_2OCF_2CH_2$, $OCF_2C_2H_4$, $C_3H_6O$, $OC_3H_6$, $C_2H_4OCH_2$, $CH_2OC_2H_4$, $CH_2O$, $OCH_2$, —CH=CH—, —C≡C— and COO;

n is 2, 3 or 4;

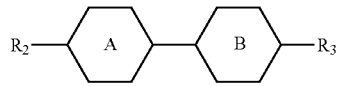

II

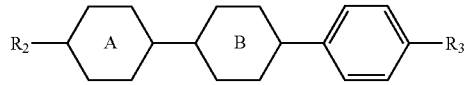

III

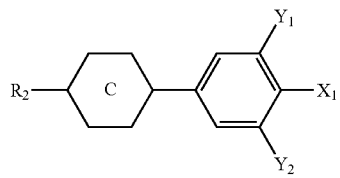

IV

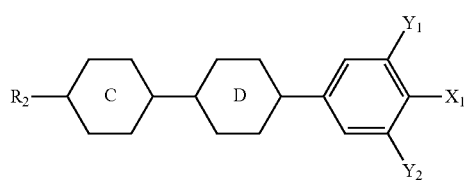

V

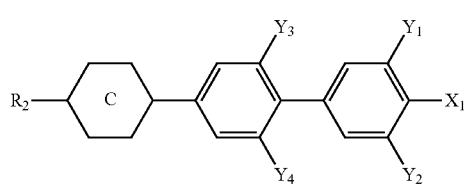

VI

-continued

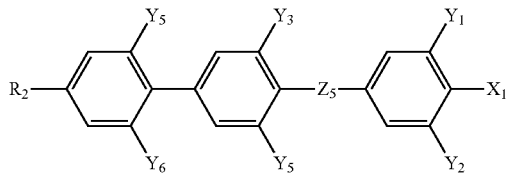

VII

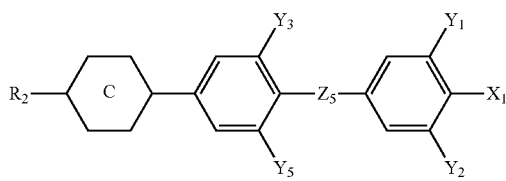

VIII

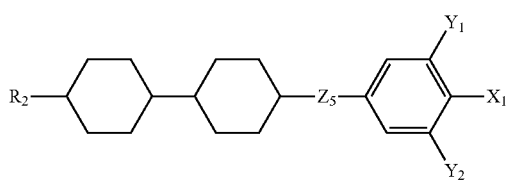

IX

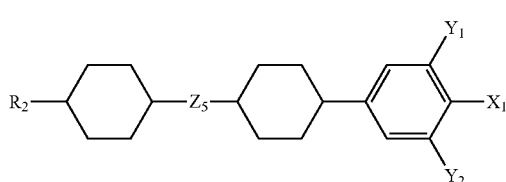

X

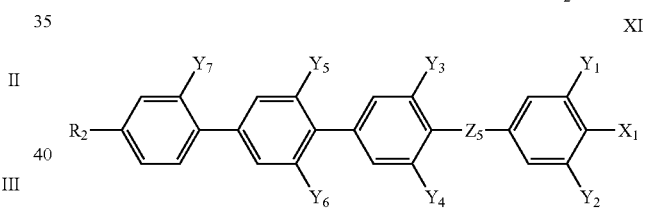

XI

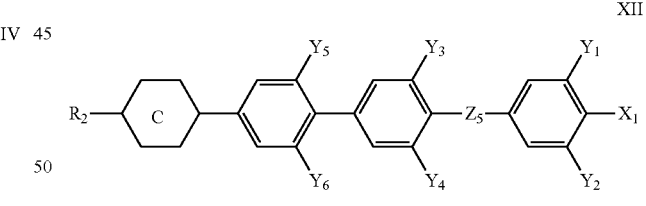

XII

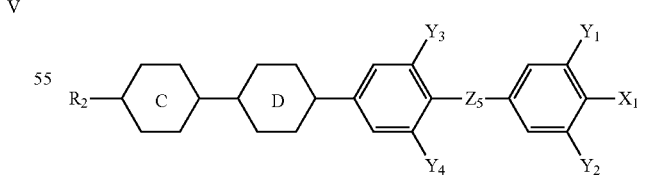

XIII

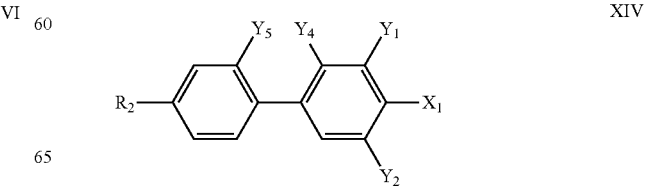

XIV

XV
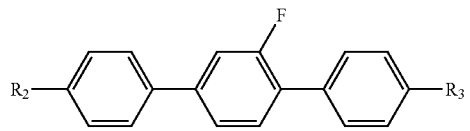

XVI
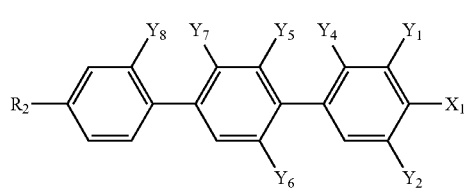

XVII
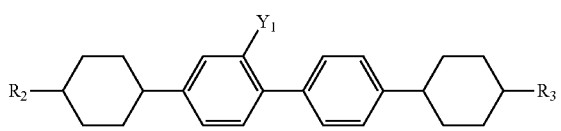

XVIII
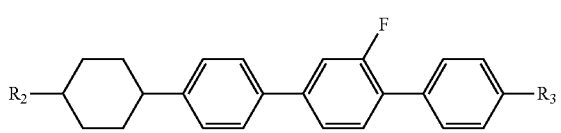

XIX
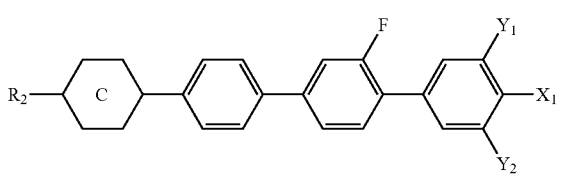

XX
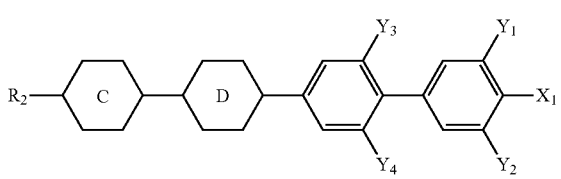

XXI
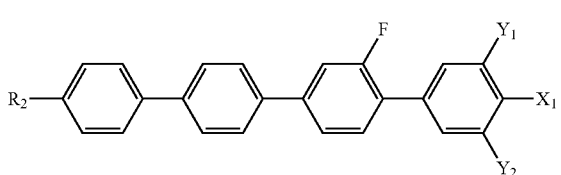

XXII
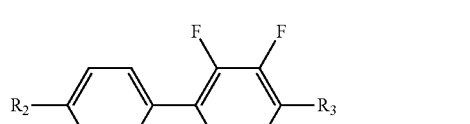

XXIII
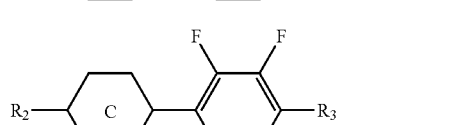

XXIV
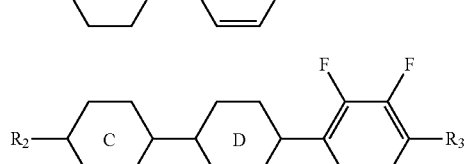

XXV
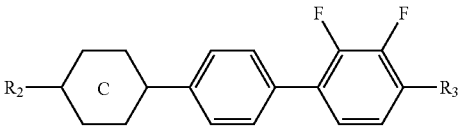

wherein, $R_2$ and $R_3$ are each independently selected from alkyl or alkoxy containing 1-7 carbon atoms, one or more $CH_2$ groups thereof may each, independently be replaced by —CH═CH— and one or more H atoms thereof may be replaced by fluorine element;

A and B are each independently selected from 1,4-cyclohexylene; 1,4-phenylene, one or more H atoms thereof may be replaced by fluorine element;

C and D are each independently selected from 1,4-cyclohexylene, one or two nonadjacent —$CH_2$— thereof may be replaced by O;

$Y_1$-$Y_7$ each independently denotes H or F;

$Z_5$ denotes a single bond, —$C_2H_4$—, —$(CH_2)_4$—, —CH═CH, —CF═CF, —$C_2F_4$—, —$CH_2CF_2$—, —$CF_2CH_2$—, —$CH_2O$—, —$OCH_2$—, —COO—, —$CF_2O$— or —$OCF_2$—;

$X_1$ denotes F, $OCF_3$, $OCHF_2$, $CF_3$, $CF_2H$, CL, OCH═$CF_2$ or $OCF_2CF$═$CF_2$.

Preferably, the liquid crystal composition provided in present invention comprising:

a) 2 to 55 weight percents of one or more compounds represented by the general formula I;

b) 17 to 82 weight percents of one or more compounds represented by the general formula II to III;

c) at most 57 weight percents of one or more compounds represented by the general formula IV to XIII;

d) at most 30 weight percents of one or more compounds represented by the general formula XIV to XVI;

e) at most 26 weight percents of one or more compounds represented by the general formula XVII to XXI;

wherein the above a) to e) sum to 100%.

More preferably, a) 3 to 50 weight percents of one or more compounds represented by the general formula I;

b) 20 to 80 weight percents of one or more compounds represented by the general formula II to III;

c) 5 to 50 weight percents of one or more compounds represented by the general formula IV to XIII;

d) 1 to 15 weight percents of one or more compounds represented by the general formula XIV to XVI;

e) 1 to 25 weight percents of one or more compounds represented by the general formula XVII to XXI;

wherein the above a) to e) sum to 100%.

Most preferably, the liquid crystal composition provided in is the present invention comprising:

a) 5 to 50 weight percents of one or more compounds represented by the general formula I;

b) 20 to 60 weight percents of one or more compounds represented by the general formula II to III;

c) 10 to 50 weight percents of one or more compounds represented by the general formula IV to XIII;

d) 3 to 15 weight percents of one or more compounds represented by the general formula XIV to XVI;

e) 3 to 20 weight percents of one or more compounds represented by the general formula XVII to XXI;

wherein the above a) to e) sum to 100%;

or a) 10 to 38 weight percents of one or more compounds represented by the general formula I;

b) 23 to 42 weight percents of one or more compounds represented by the general formula II to III;

c) 34 to 45 weight percents of one or more compounds represented by the general formula IV to a XIII;

d) at most 12 weight percents of one or more compounds represented by the general formula XIV to XVI;

e) at most 8 weight percents of one or more compounds represented by the general formula XVII to XXI;

wherein the above a) to e) sum to 100%;

or a) 28 to 46 weight percents of one or more compounds represented by the general formula I;

b) 23 to 56 weight percents of one or more compounds represented by the general formula II to III;

c) at most 20 weight percents of one or more compounds represented by the general formula IV to a XIII;

d) 8 to 14 weight percents of one or more compounds represented by the general formula XIV to XVI;

e) 8 to 19 weight percents of one or more compounds represented by the general formula XVII to XXI;

wherein the above a) to e) sum to 100%;

or a) 15 to 41 weight percents of one or more compounds represented by the general formula I;

b) 20 to 42 weight percents of one or more compounds represented by the general formula II to III;

c) 22 to 33 weight percents of one or more compounds represented by the general formula IV to XIII;

d) 14 to 30 weight percents of one or more compounds represented by the general formula XIV to XVI;

e) 3 to 24 weight percents of one or more compounds represented by the general formula XVII to XXI;

wherein the above a) to e) sum to 100%.

The liquid crystal composition of the present invention provides the compounds of formula I exhibits a good miscibility, excellent overall performances, especially high clearing point.

Wherein the compound of formula I which is preferably represented, R is selected from H and unsubstituted or substituted alkyl or alkoxy group each containing 1 to 7 carbon atoms, wherein these groups one or more $CH_2$ groups may also be substituted independently by —CH=CH—, —O—, in a manner not directly bonded to each other to O atoms, and wherein one or more H atoms may be replaced by halogen;

$A_1$, $A_2$, $A_3$, $A_4$ and $A_5$ are each independently selected from: a single bond; 1,3-cyclopentyl, 1,4-cyclohexylene, 1,4-cyclohexenyl; 1,4-phenyl, naphthalene 2,6-diyl; trans-decalin-2,6-diyl; tetrahydronaphthalene-2,6-diyl; indan, wherein, in a 1,4-cyclohexylene $CH_2$ or two $CH_2$ not directly connected may be replaced by O or S; 1,4-phenylene in a CH or two CH not directly connected may be replaced by N; and hydrogen may be independently in each case substituted by fluorine; while $A_1$, $A_2$, $A_3$, $A_4$ and $A_5$ cannot be all a single bond;

$Z_1$, $Z_2$, $Z_3$ and $Z_4$ are each independently selected from: a single bond, —$(CH_2)_2$—, —$(CH_2)_4$—, $CF_2O$, $OCF_2$, CF=CF, $CH_2CF_2$, $CF_2CH_2$, $CH_2O$, $OCH_2$, —CH=CH—;

n is 2, 3 or 4;

More preferably:

R is selected from H and unsubstituted or substituted alkyl or alkoxy containing 1 to 6 carbon atoms, wherein these groups with one or more $CH_2$ groups may each, independently replaced by —CH=CH—, —O—, with O atoms not directly bonded, and wherein one or more H atoms may also be replaced by fluorine;

$A_1$, $A_2$, $A_3$, $A_4$ and $A_5$ are each independently selected from: a single bond; 1,4-cyclohexylene; 1,4-cyclohexenyl; phenyl-1,4; wherein 1,4-cyclohexylene one or two $CH_2$ not directly connected may be replaced by O; and hydrogen may independently be substituted by one or more fluorine in each case; while $A_1$, $A_2$, $A_3$, $A_4$ and $A_5$ cannot be all a single bond;

$Z_1$, $Z_2$, $Z_3$ and $Z_4$ are each independently selected from: a single bond, —(CH2) 2-, CF2O;

n is 2, 3 or 4;

More preferred compounds of formula I can be selected from at least one compounds listed as follows:

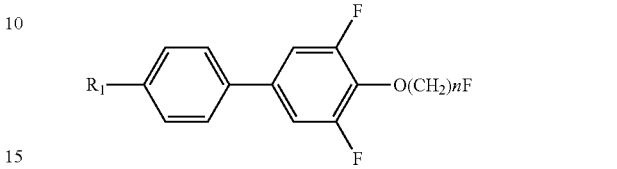

I1

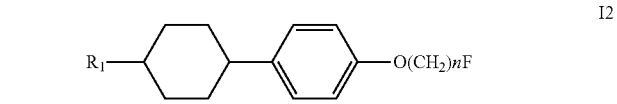

I2

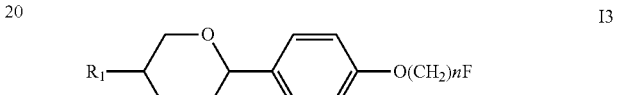

I3

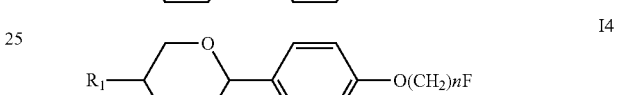

I4

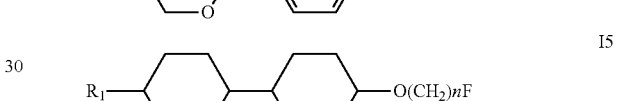

I5

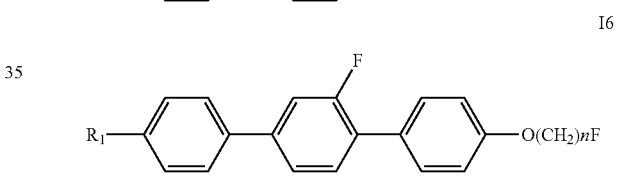

I6

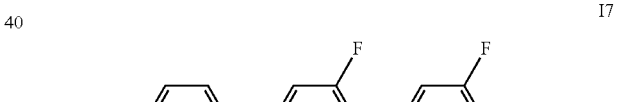

I7

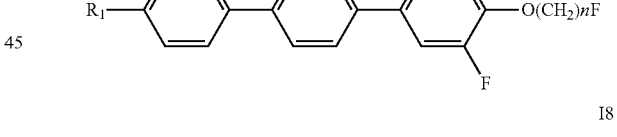

I8

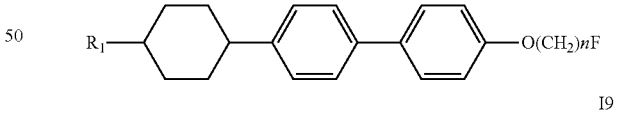

I9

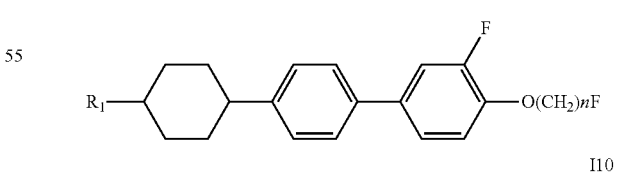

I10

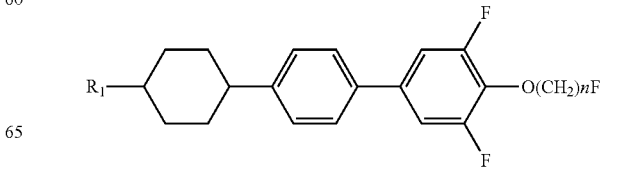

-continued
I11
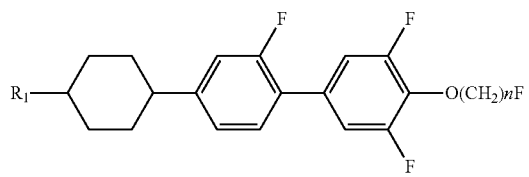
I12
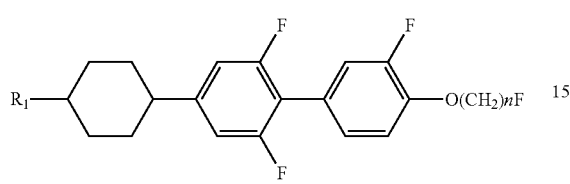
I13
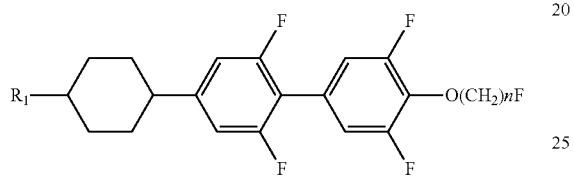
I14
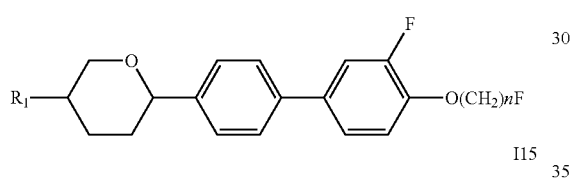
I15
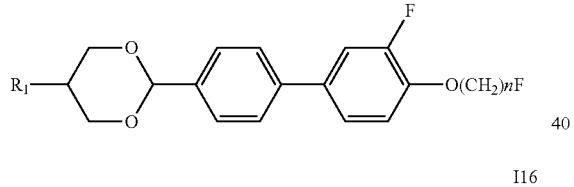
I16
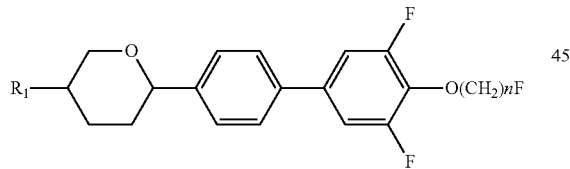
I17
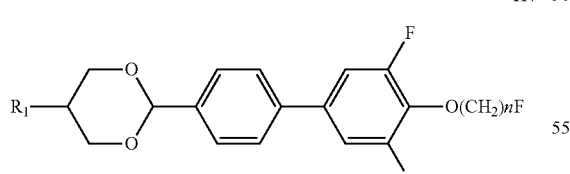
I18
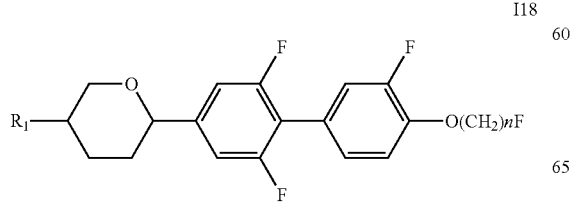
-continued
I19
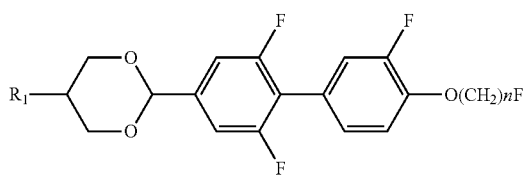
I20
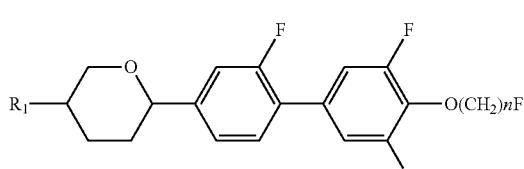
I21
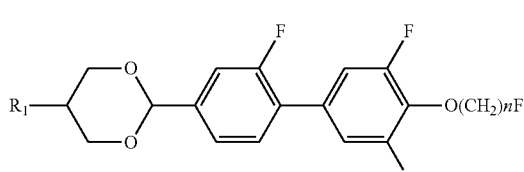
I22
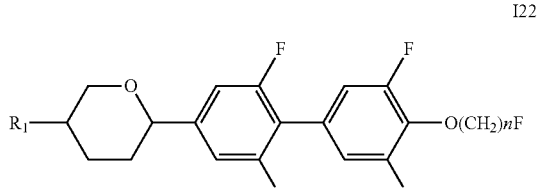
I23
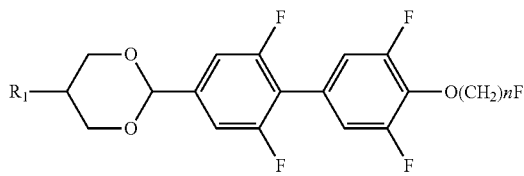
I24
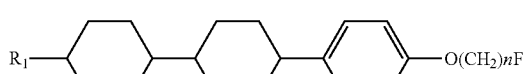
I25
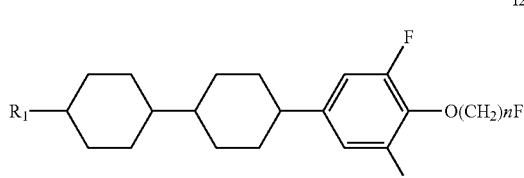
I26
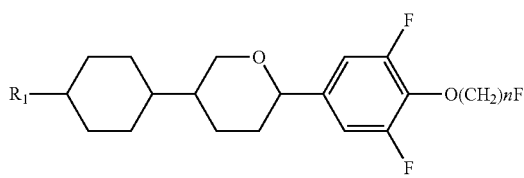

-continued
I27
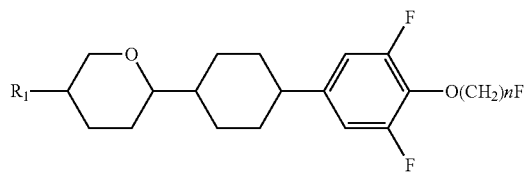
I28
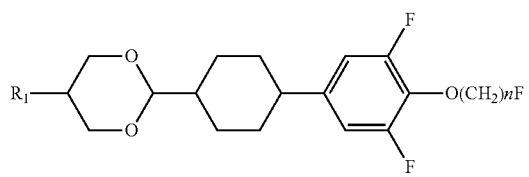
I29
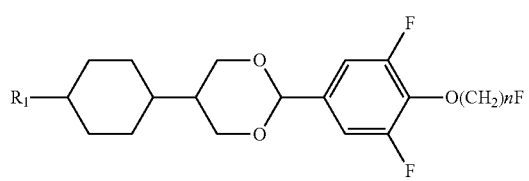
I30
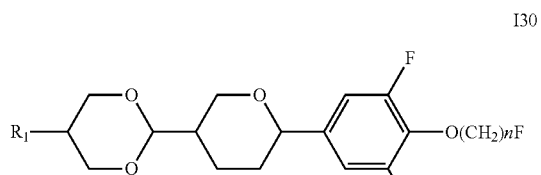
I31
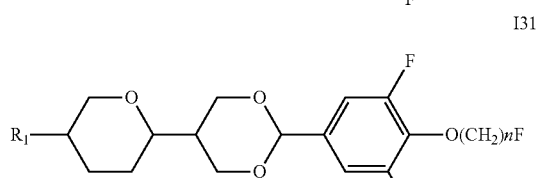
I32
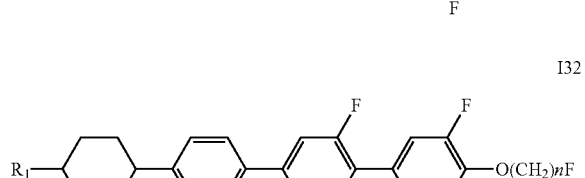
I33
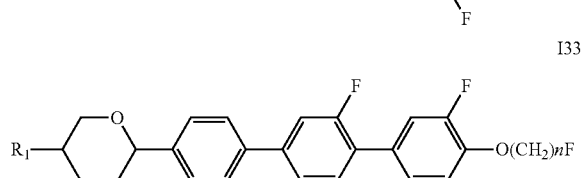
I34
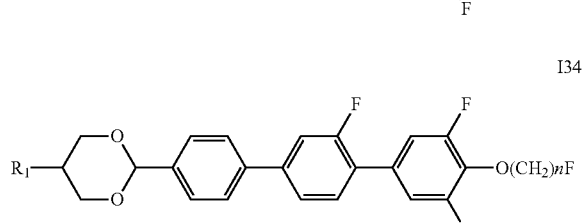
-continued
I35
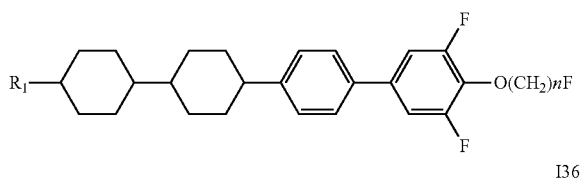
I36
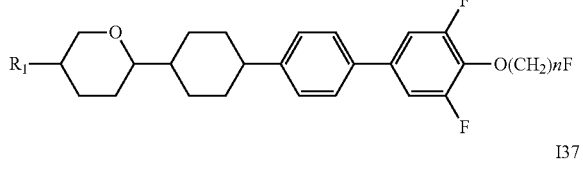
I37
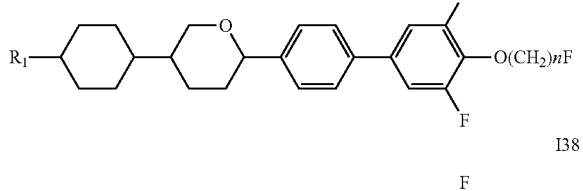
I38
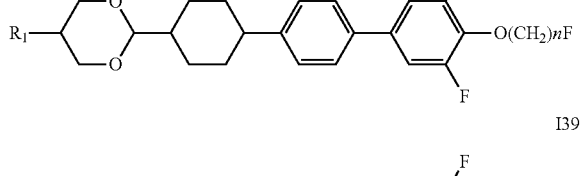
I39
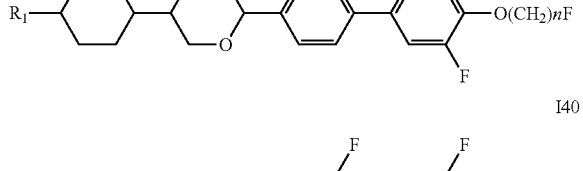
I40
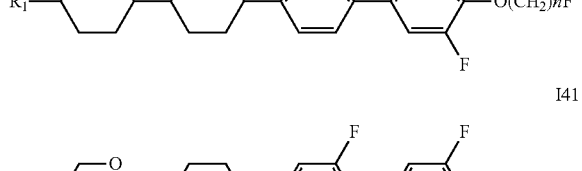
I41
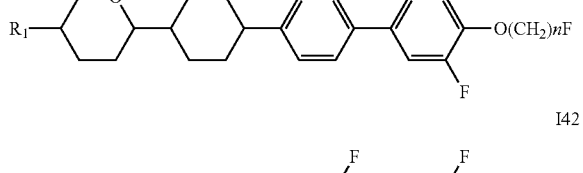
I42
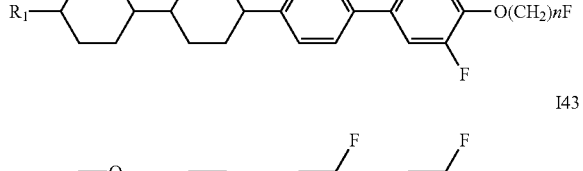
I43
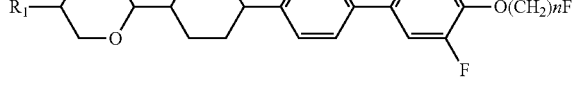

-continued
I44
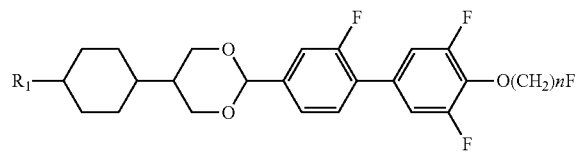
I45
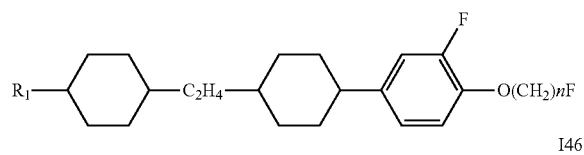
I46
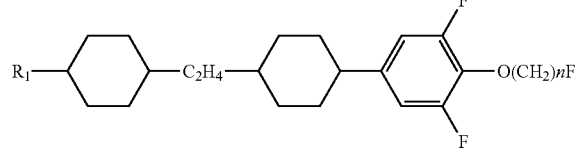
I47
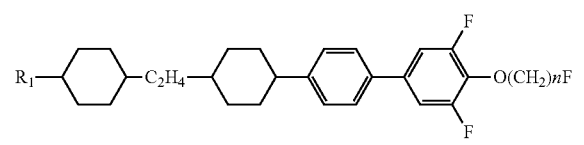
I48
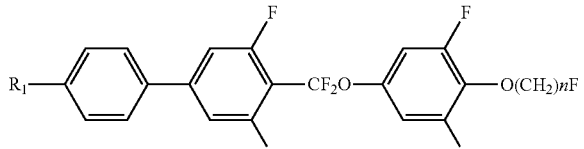
I49
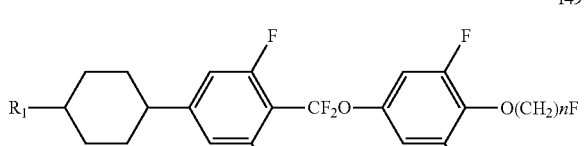
I50
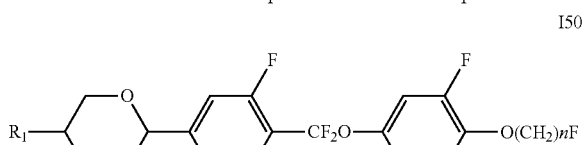
I51
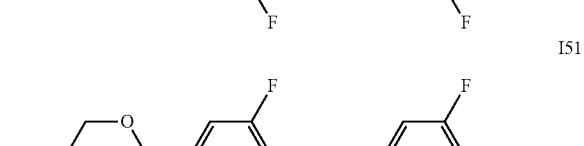
I52
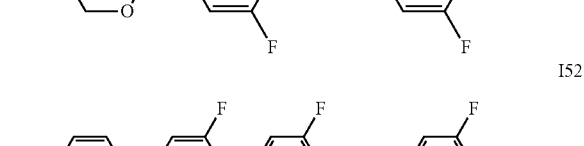
-continued
I53
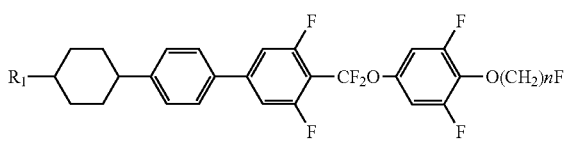
I54
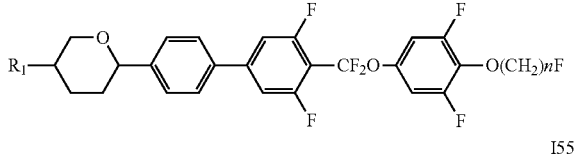
I55
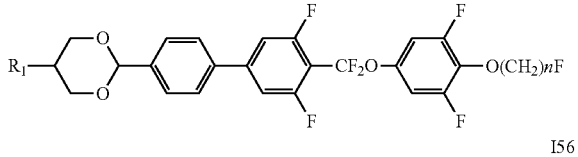
I56
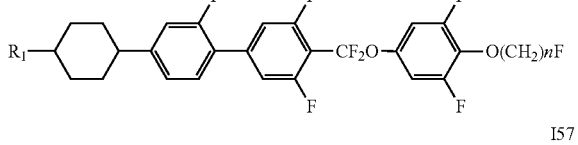
I57
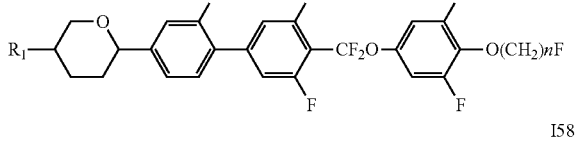
I58
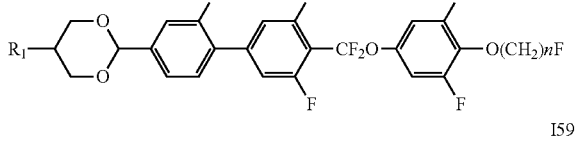
I59
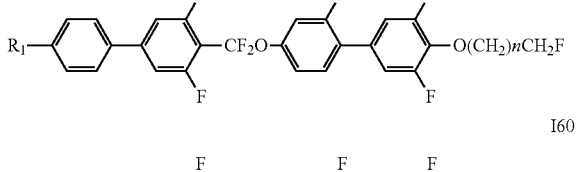
I60
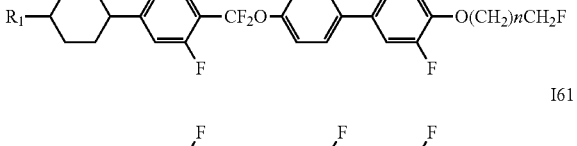
I61
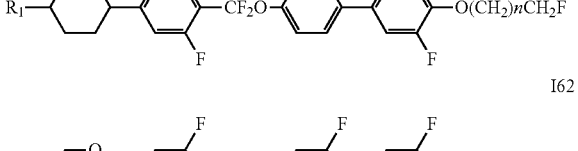
I62
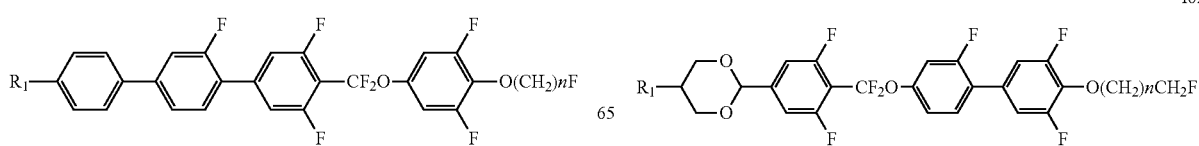

wherein $R_1$ is selected from alkyl or alkoxy group containing 1 to 6 carbon atoms,
wherein these groups one or more $CH_2$ groups may each, independently be replaced by —CH=CH—, one or more H atom may be replaced by fluorine;
n is 2, 3 or 4.
The most preferred compounds of formula I are as follows:
I1-1
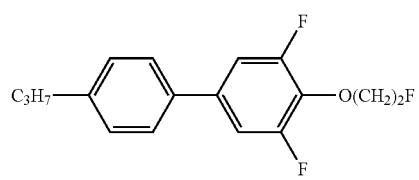
I1-2
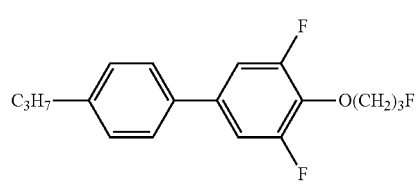
I2-1
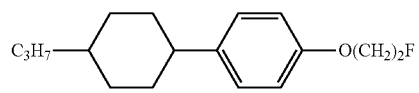
I2-2
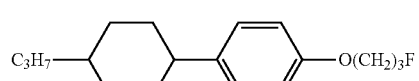
I3-1
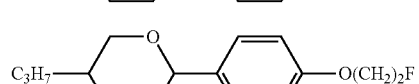
I3-2
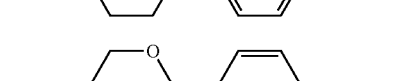
I4-1
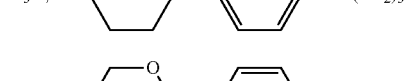
I4-2
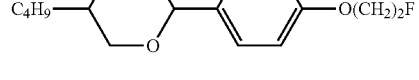
I5-1
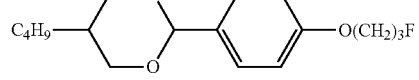
I5-2
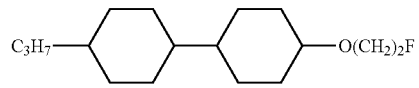
I5-3
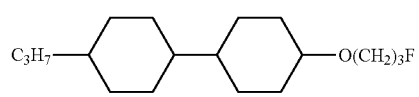
I6-1
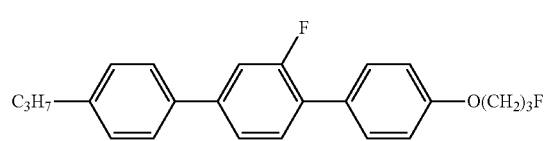
-continued
I7-1
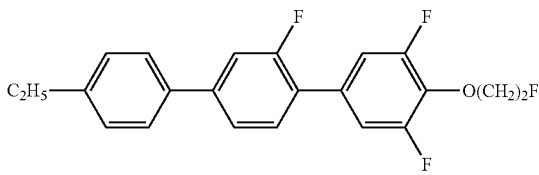
I7-2
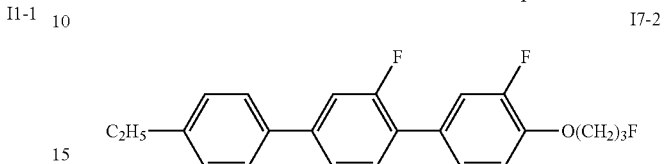
I7-3
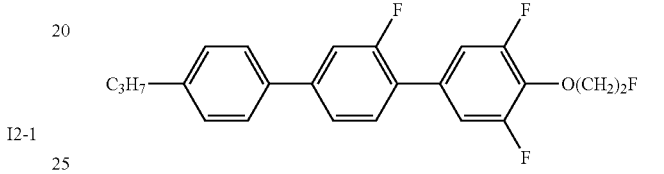
I7-4
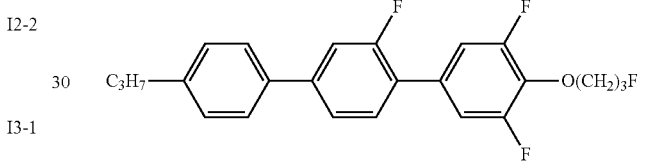
I8-1
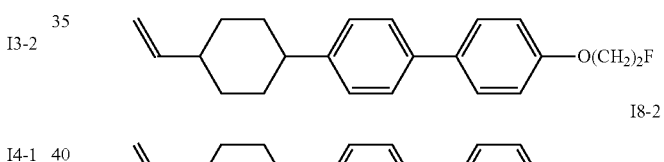
I8-2
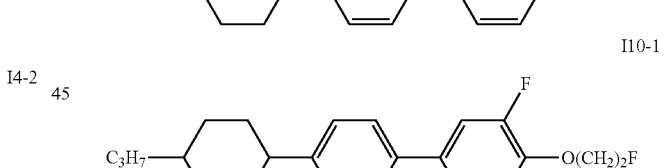
I10-1
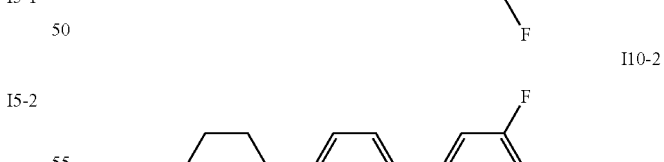
I10-2
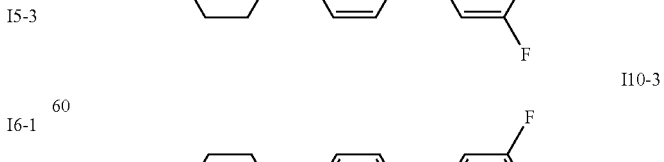
I10-3
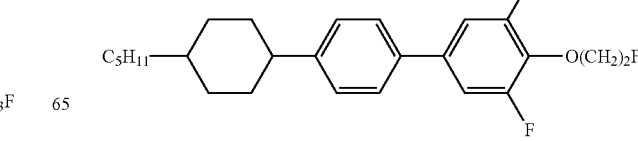

I10-4
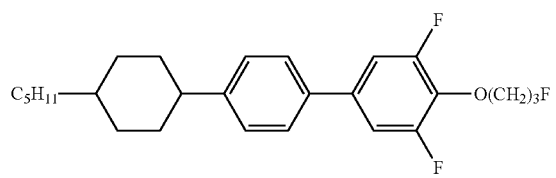
I11-1
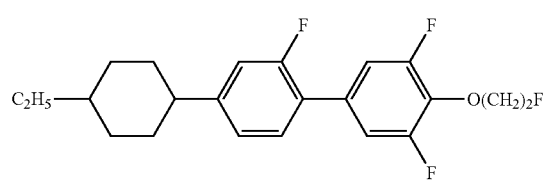
I11-2
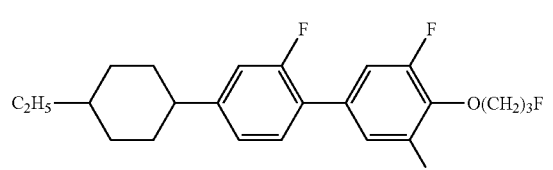
I11-3
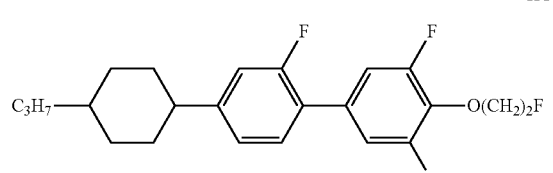
I11-4
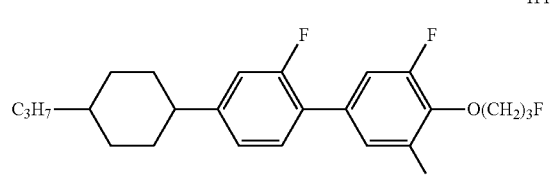
I16-1
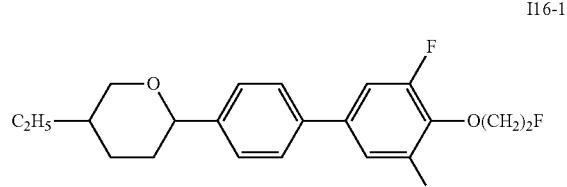
I16-2
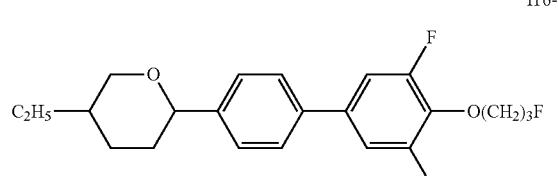
I16-3
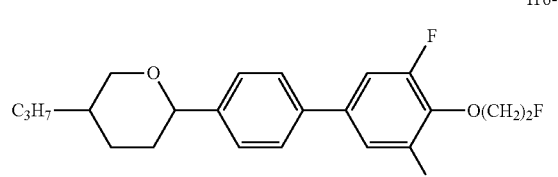
I16-4
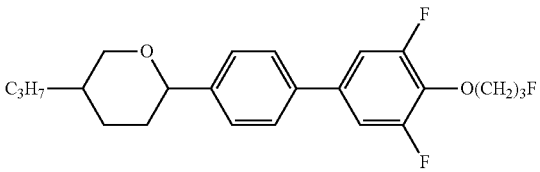
I16-5
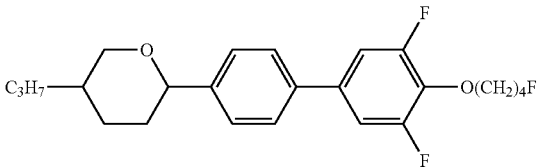
I17-1
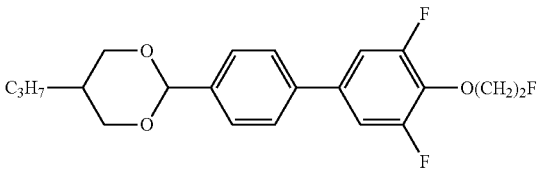
I17-2
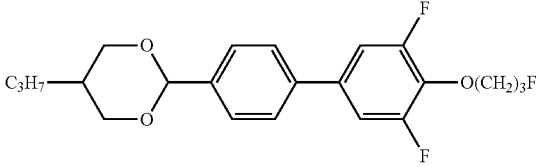
I17-3
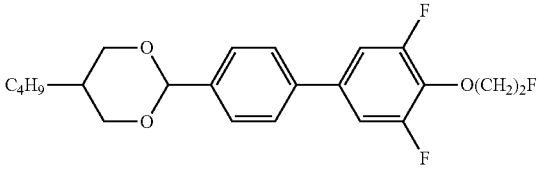
I17-4
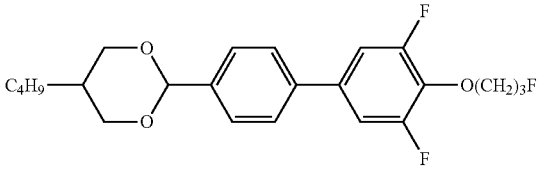
I24-1
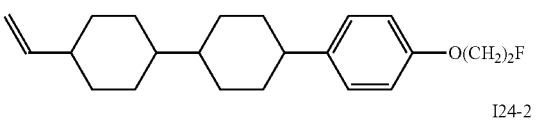
I24-2
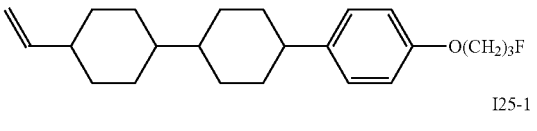
I25-1
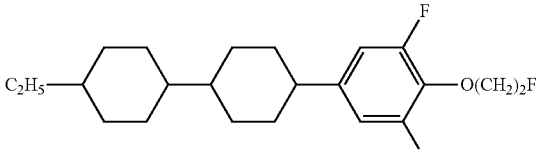

I25-2
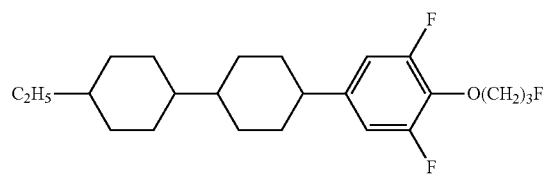
I25-3
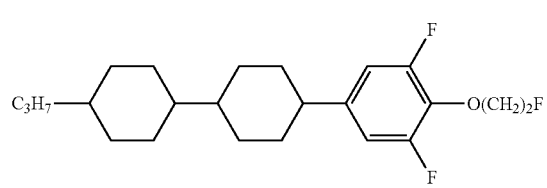
I25-4
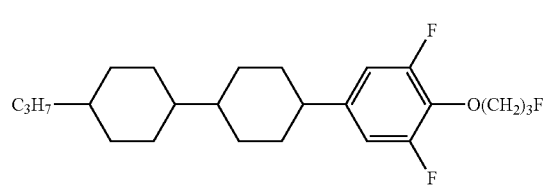
I29-1
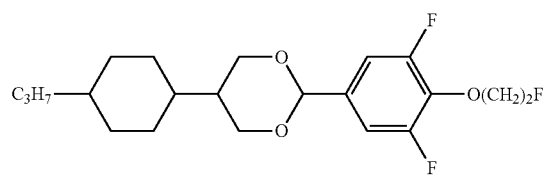
I29-2
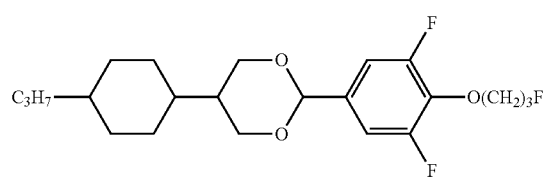
I32-1
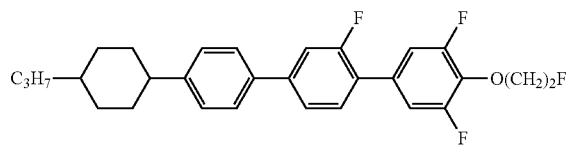
I32-2
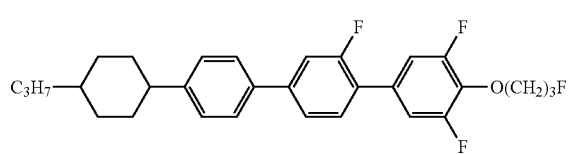
I33-1
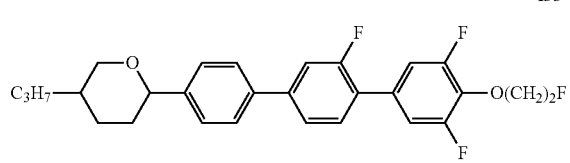
I33-2
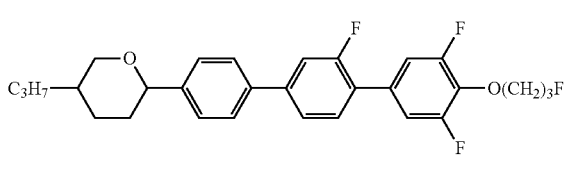
I34-1
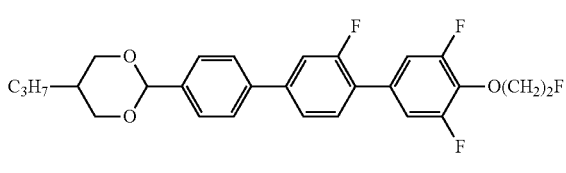
I34-2
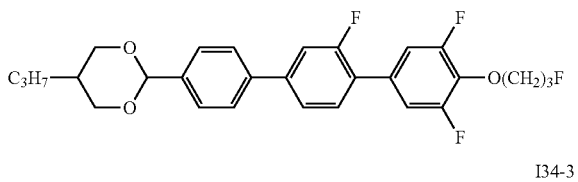
I34-3
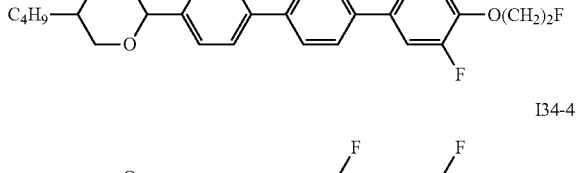
I34-4
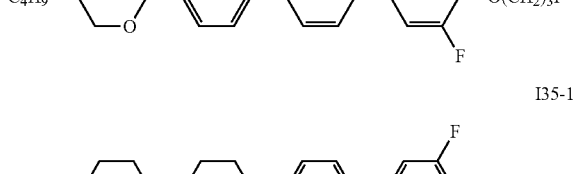
I35-1
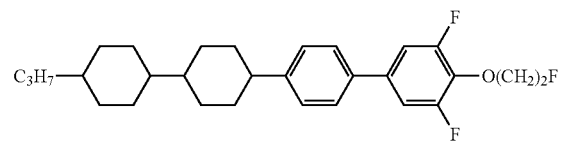
I35-2
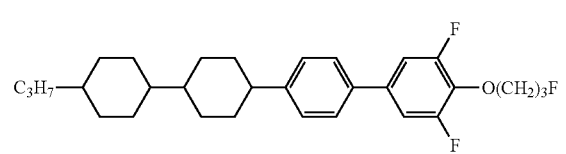
I35-3
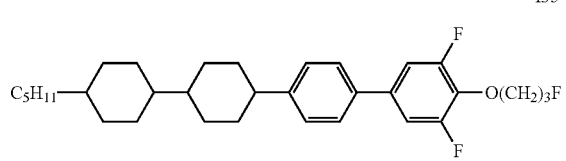
I35-4

I40-1
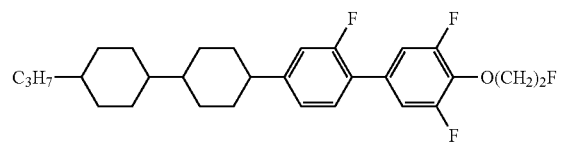
I40-2
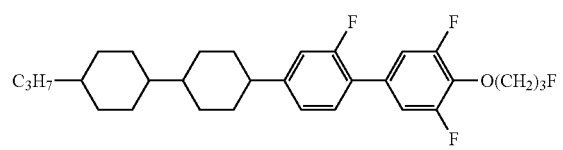
I39-1
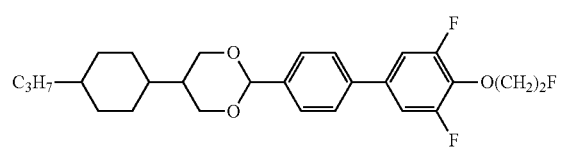
I39-2
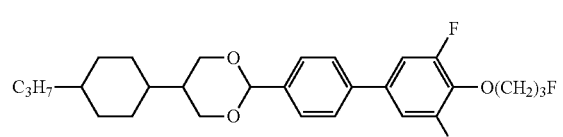
I48-1
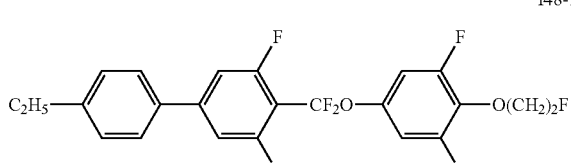
I48-2
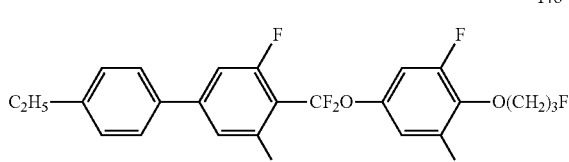
I48-3
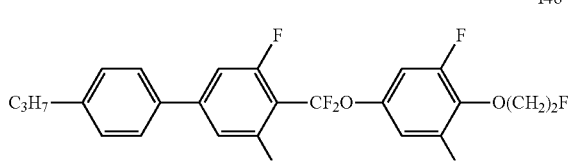
I48-4
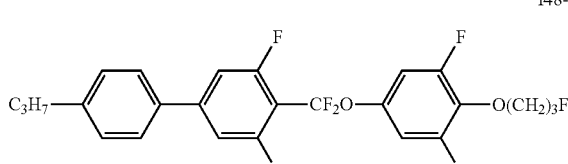
I48-5
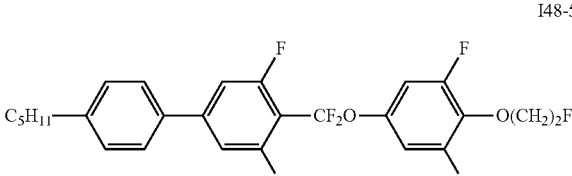
I48-6
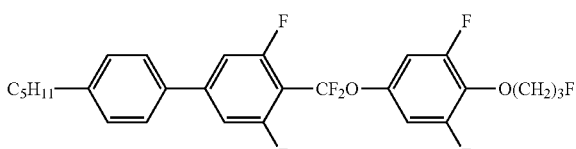
I51-1
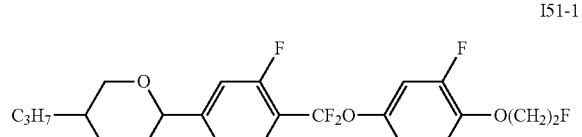
I51-2
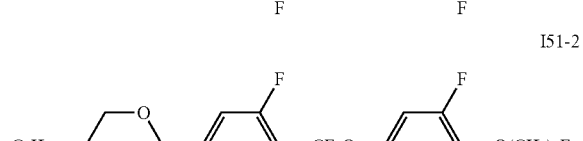
I51-3
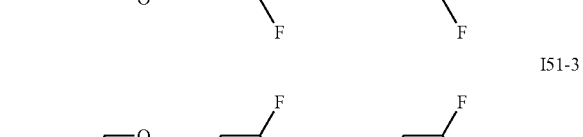
I51-4
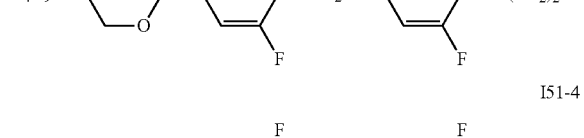
I52-1
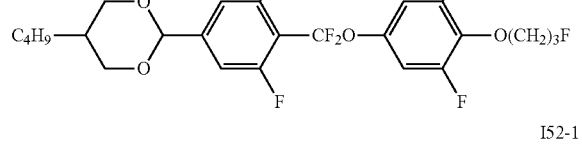
I52-2
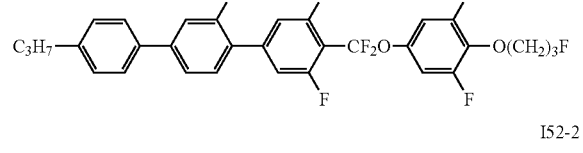
I52-3
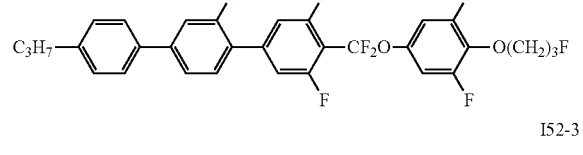
I52-4
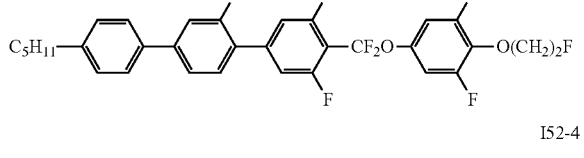

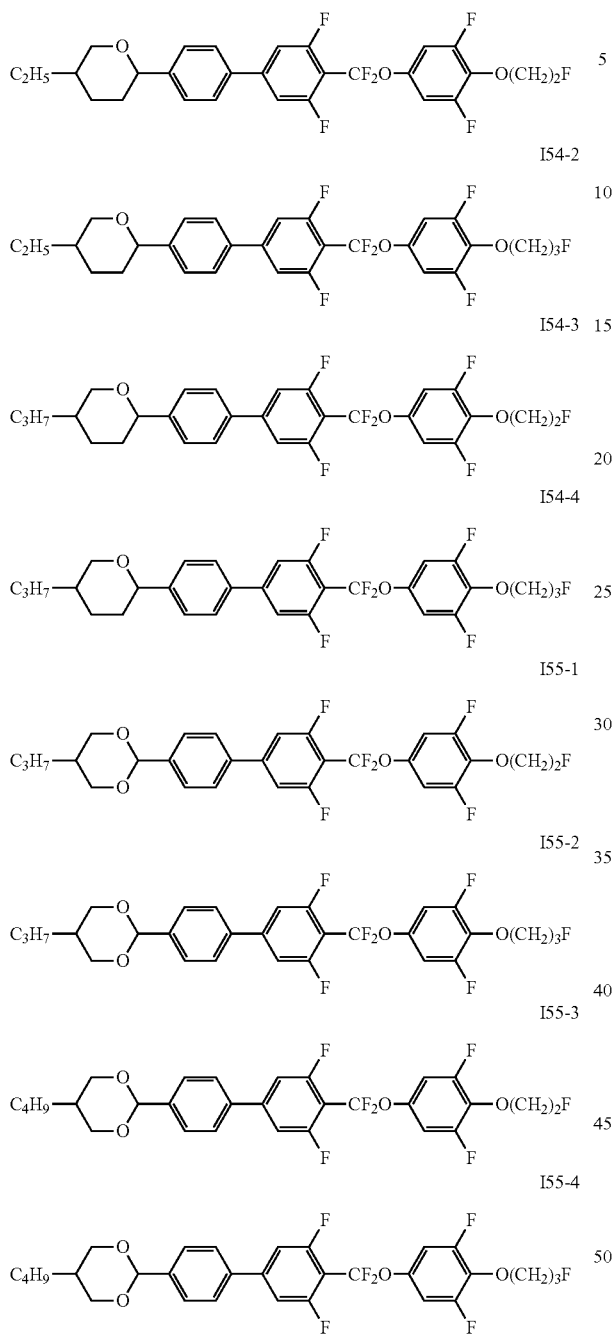

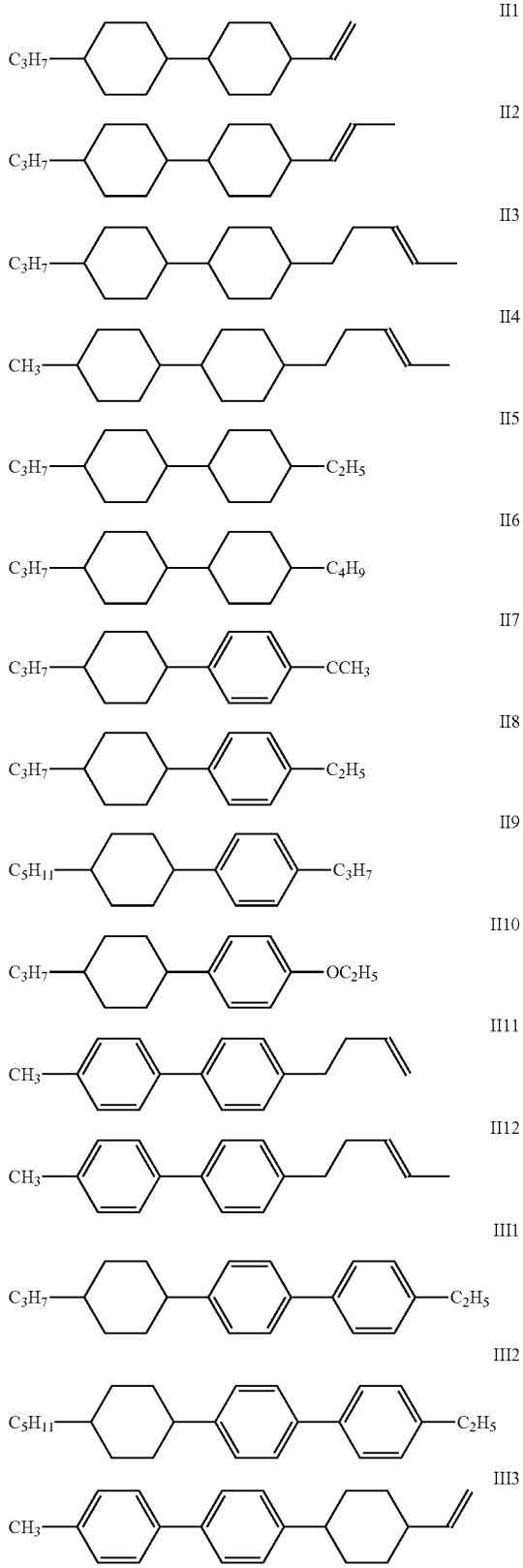

Wherein, preferably the formula II and/or III compound represented by the one or more compounds selected from the following:

Two ring structures of the compounds with general formula II or III, provided in the present invention, are non-polar components. Such compounds have a significant effect on reducing the systematic viscosity and enhancing response speed, which is essential for a mixture of liquid crystal compounds to achieve fast response time of the display. The compounds with formula II provided by the invention are of negative dielectric anisotropy (−Δε), and have characteristics of low viscosity at low temperature. Adding to a liquid crystal composition with positive dielectric anisotropy, such compounds can effectively improve transmittance characteristics of the liquid crystal displays.

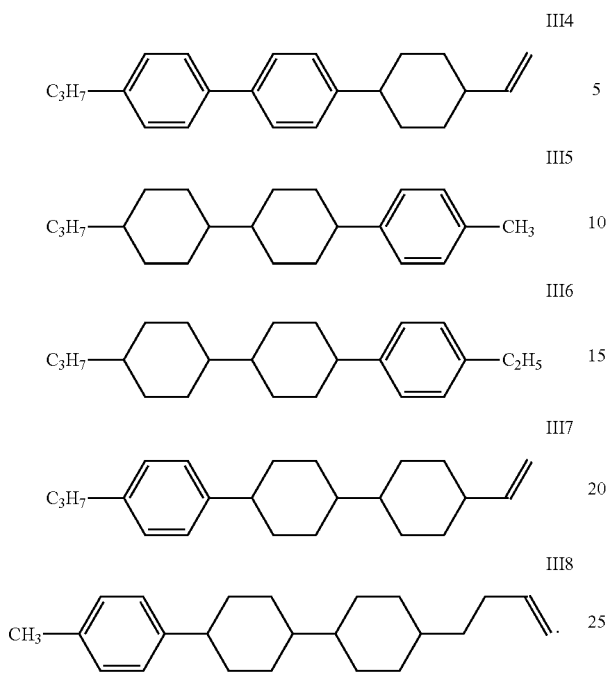

The compounds with general formula IV to XIII, provided in the present invention, are polar compounds, the structure has a large dielectric anisotropy, which will be able to reduce display's driving voltage and enhance energy conservation, when applied to the liquid crystal composition.

Preferably the compound of Formula IV to XIII is selected from the compounds represented by one or more of:

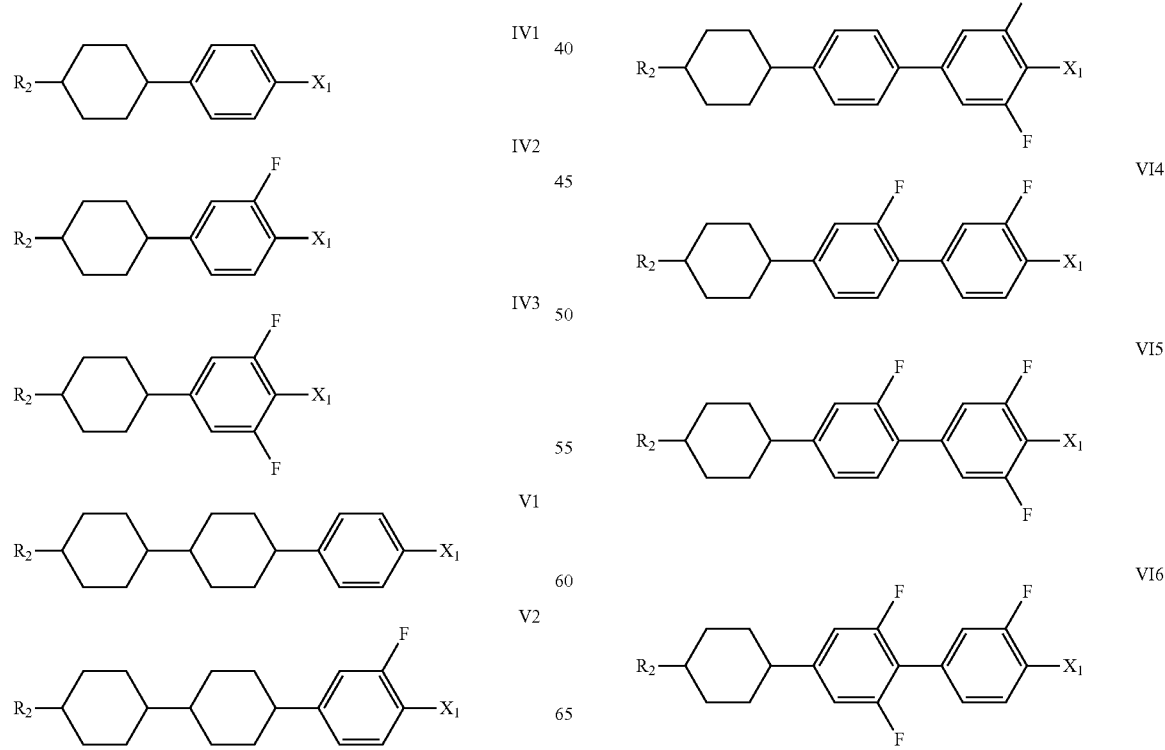

VI7
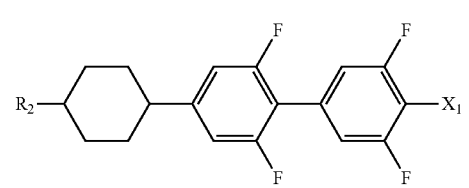
VI8
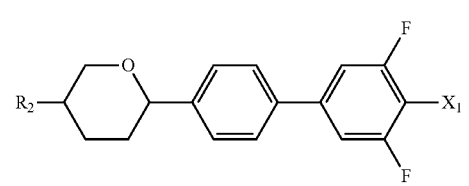
VI9
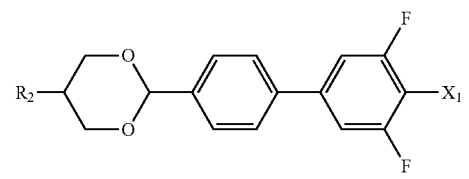
VI10
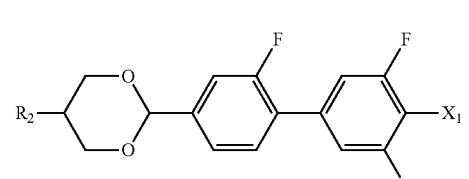
VI11
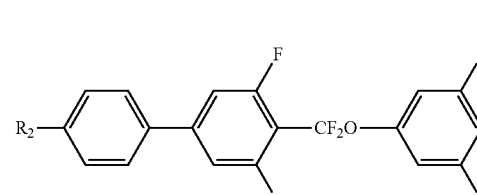
VI12
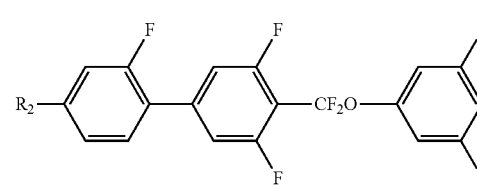
VIII1
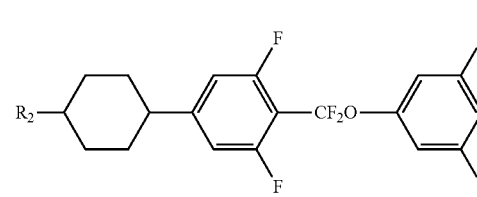
VIII2
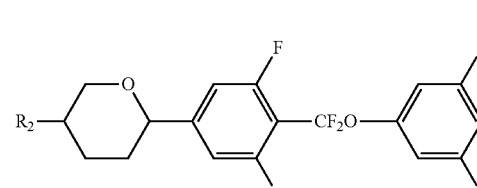
VIII3
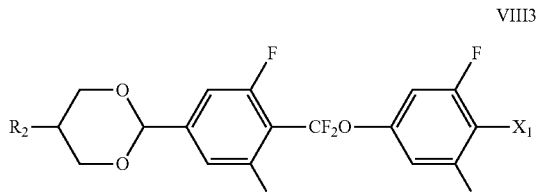
IX1
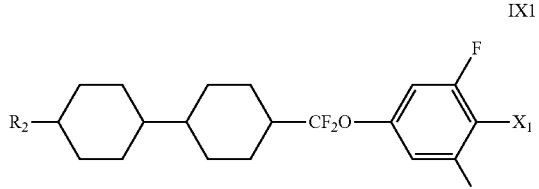
IX2
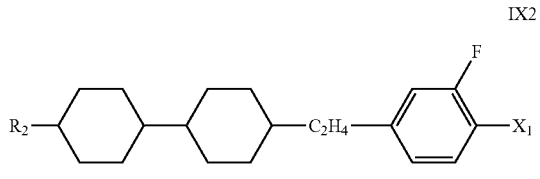
IX3
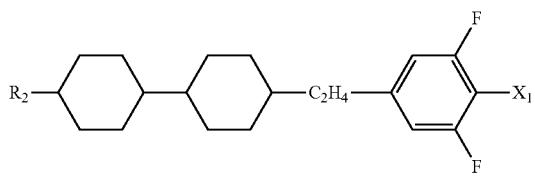
X1
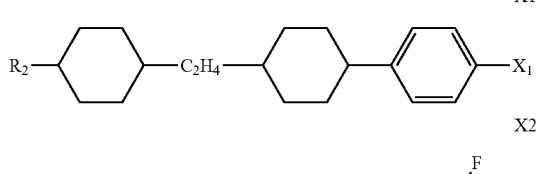
X2
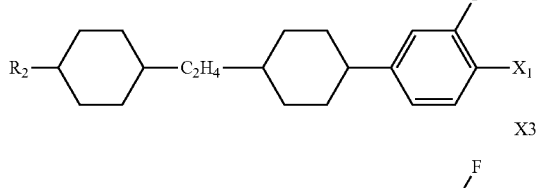
X3
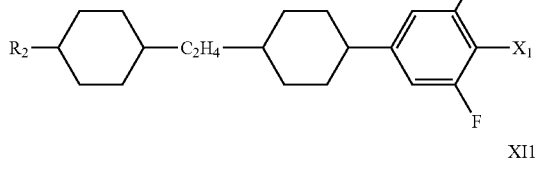
XI1
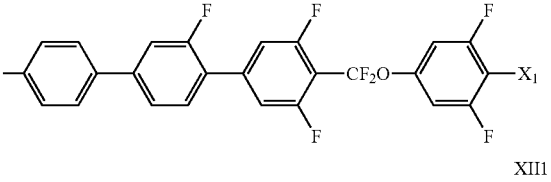
XII1
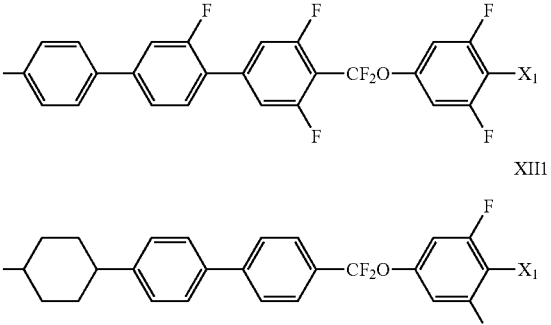

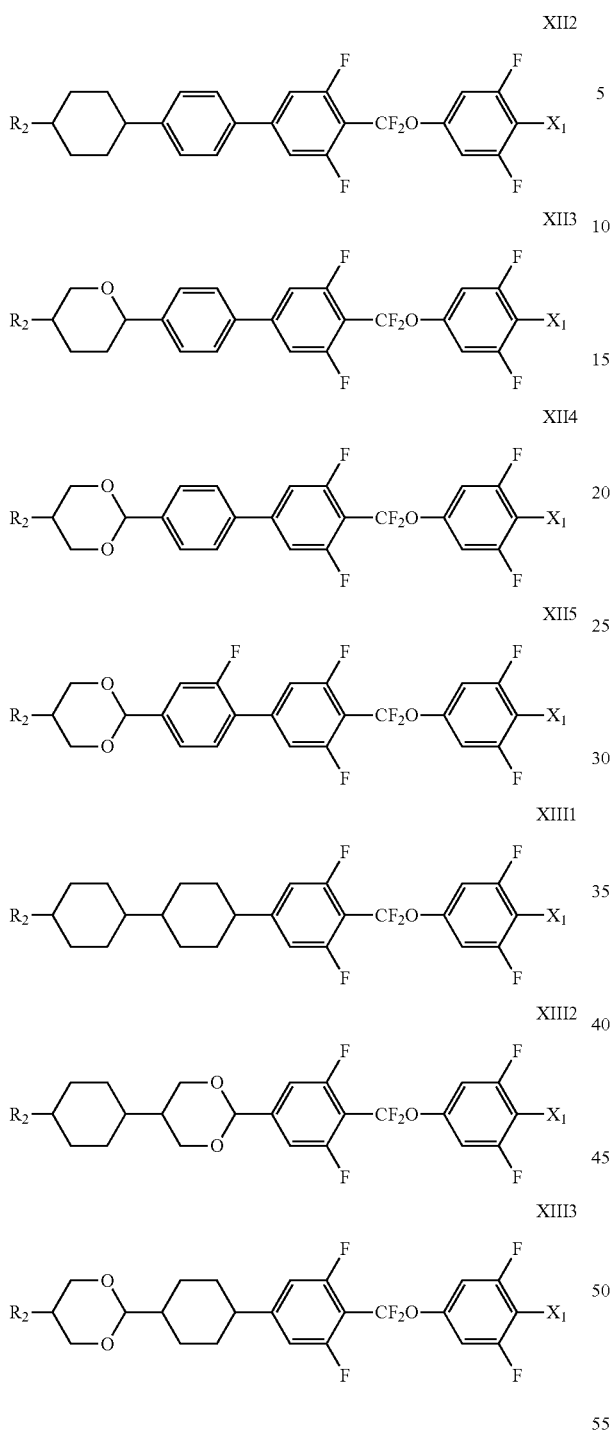

wherein $R_2$ and $X_1$ represents supra, $Y_1$-$Y_7$ represents H or F independently of one another.

The general formula XIV to XVI, provided in the present invention, is of biphenyl or terphenyl structure that has a large optical anisotropy, which may increase the optical anisotropy, thereby reduce the cell thickness and improve the response speed, when applied to the liquid crystal composition.

Wherein the compound of Formula XIV to XVI is preferably represented by a compound selected from one or more of:

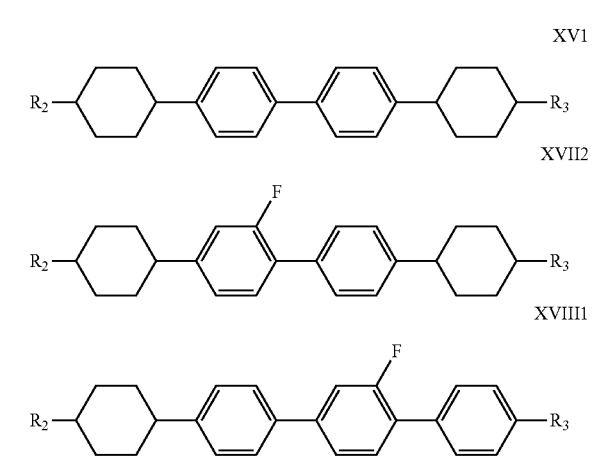

wherein $R_2$, $R_3$, $Y_1$, $Y_2$ and $X_1$ represents supra.

The general formula XVII to XXI, provided in the present invention, is of tetracyclic structure, which has a high clearing point, applied to the liquid crystal composition may improve temperature range of the device.

Wherein said compound of Formula XXI to XVII preferably represents one or more compounds selected from the following:

-continued

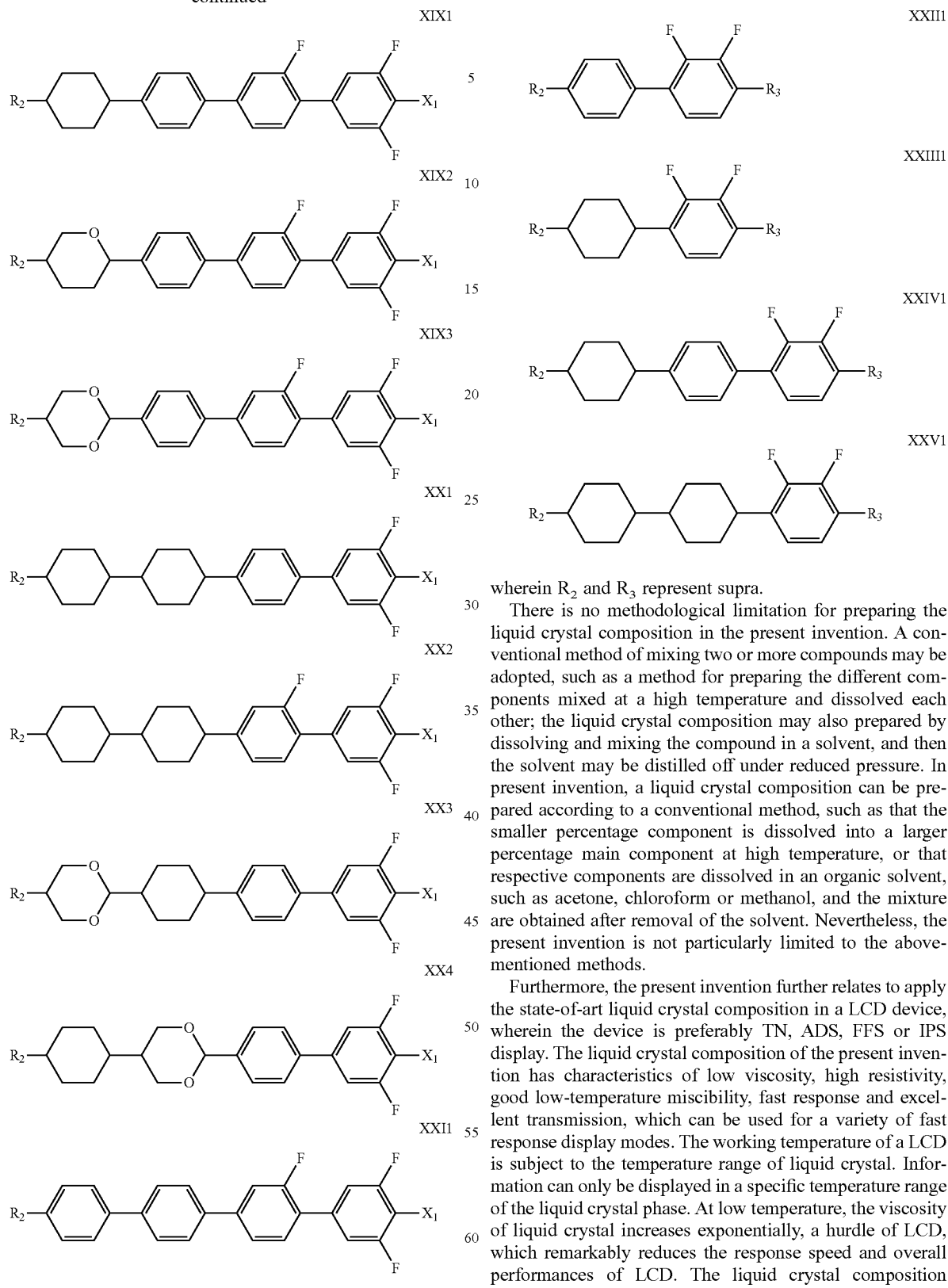

wherein R₂, R₃ and X₁ represents supra.

And the compound is preferably, to the general formula XXII, XXV selected from compounds represented by one or more of:

wherein R₂ and R₃ represent supra.

There is no methodological limitation for preparing the liquid crystal composition in the present invention. A conventional method of mixing two or more compounds may be adopted, such as a method for preparing the different components mixed at a high temperature and dissolved each other; the liquid crystal composition may also prepared by dissolving and mixing the compound in a solvent, and then the solvent may be distilled off under reduced pressure. In present invention, a liquid crystal composition can be prepared according to a conventional method, such as that the smaller percentage component is dissolved into a larger percentage main component at high temperature, or that respective components are dissolved in an organic solvent, such as acetone, chloroform or methanol, and the mixture are obtained after removal of the solvent. Nevertheless, the present invention is not particularly limited to the above-mentioned methods.

Furthermore, the present invention further relates to apply the state-of-art liquid crystal composition in a LCD device, wherein the device is preferably TN, ADS, FFS or IPS display. The liquid crystal composition of the present invention has characteristics of low viscosity, high resistivity, good low-temperature miscibility, fast response and excellent transmission, which can be used for a variety of fast response display modes. The working temperature of a LCD is subject to the temperature range of liquid crystal. Information can only be displayed in a specific temperature range of the liquid crystal phase. At low temperature, the viscosity of liquid crystal increases exponentially, a hurdle of LCD, which remarkably reduces the response speed and overall performances of LCD. The liquid crystal composition according to the present invention overcomes these problems. Characterized by its low viscosity, good low-temperature performance and excellent transmission allows the liquid crystals to use in TN, IPS or FFS displays with remarkably improved performances.

DETAILED DESCRIPTION

The following examples illustrate the embodiment of the invention but the applicants do not intend to limit the scope of the present invention.

The embodiment of the invention for preparing the liquid crystal compositions is described as follows:

To prepare a homogeneous liquid crystal solution, a well-known thermo dissolution approach in the field was introduced: firstly, weight the liquid crystal compounds on the weighting scales; secondly, mixing the liquid crystal compounds without specific sequential requirement, but usually in order of higher melting point first; thirdly, stir the compounds at 60-100 C, such that the components melted uniformly. After filtration, rotary evaporation and packaging, the final target sample is obtained.

Unless otherwise indicated, percentages are by weight and temperatures are given in degrees Celsius in the contest. The following abbreviations are used:

$\Delta n$ is optical anisotropy (20° C.), $\Delta \varepsilon$ dielectric anisotropy (25° C., 1000 Hz), $\gamma_1$ for the bulk viscosity (mPa·s, 25° C.), Cp is the clearing point of liquid crystal composition (° C.). For ease of illustration, in the following examples, the group structure of the liquid crystal compound is represented by the code shown in Table 1:

TABLE 1

| The group structure and the code of the liquid crystal compound | | |
|---|---|---|
| Group structure | Code | Name of group |
| (cyclohexylene) | C | 1,4-cyclohexylene |
| (phenylene) | P | 1,4-phenylene |
| (2-fluoro-phenylene) | G | 2-fluoro-1,4-phenylene |
| (2,6-difluoro-phenylene) | U | 2,6-difluoro-1,4-phenylene |
| (2,3-difluoro-phenylene) | W | 2,3-difluoro-1,4-phenylene |
| (tetrahydropyran) | A | 2,5-tetrahydropyran |
| (dioxane) | D | 2,6-dioxane-1,4-bis oxetanyl |
| —O— | O | oxygen substituent |
| —F | F | Fluoro substituent |
| —OCH$_2$CH$_2$F | O2F | 2-fluoro-ethoxy |
| —OCH$_2$CH$_2$CH$_2$F | O3F | 3-fluoropropoxy |
| —OCF$_3$ | OCF3 | trifluoromethoxy |
| —OCF$_2$H | OCF2H | difluoromethoxy |
| —CF$_3$ | CF3 | trifluoromethyl |
| —Cl | Cl | chlorine |
| CH$_2$CH$_2$ | 2 | ethyl bridge |
| —CF$_2$O— | Q | difluoromethoxy bridge |
| —OCHF$_2$ | OCHF2 | Difluoromethoxy |
| —CH=CH— | V | Alkenyl group |
| C≡C | T | alkynyl |

The following structure, as an example,

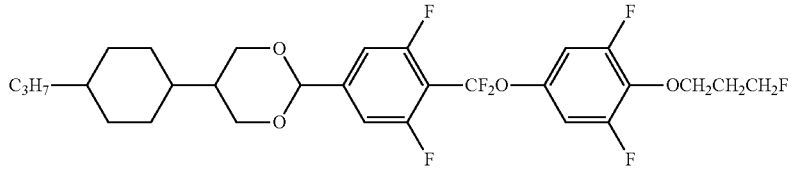

can be represented as CDUQU-3.O3F.

The following structure, as another example,

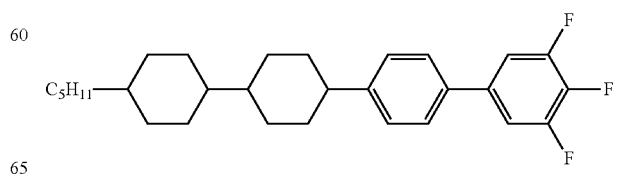

can be represented as CCPU-5.F.

The following examples describe in detail the percentage ratio of the liquid crystal compounds prepared according to the present invention and the performance parameters of the resulting liquid crystal composition as shown in the following tables.

Example 1

Table 2 Percentage of component and performance parameters of the liquid crystal composition of Example 1

| Component | wt % | Perameter | Value |
|---|---|---|---|
| CPU-3.O2F | 3 | Δn | 0.112 |
| CPU-3.O3F | 3 | Δε | +5.0 |
| PUQU-3.O2F | 6 | $\gamma_1$ (mPa · s) | 65.0 |
| PUQU-3.O3F | 6 | Cp (° C.) | 75 |
| PUQU-5.O2F | 6 | | |
| PUQU-5.O3F | 5 | | |
| PGUQU-3.O3F | 6 | | |
| CCP-V.1 | 4 | | |
| CCP-V2.1 | 3 | | |
| CC-3.V | 40 | | |
| CC-3.V1 | 3 | | |
| PGP-2.3 | 5 | | |
| PGP-2.4 | 5 | | |
| PGP-3.5 | 5 | | |

The composition has a low viscosity, which is suitable for fast response LCD device.

Example 2

Table 3 percentage of component and performance parameters of the liquid crystal composition of Example 2

| Component | wt % | Perameter | Value |
|---|---|---|---|
| CPU-3.O2F | 3 | Δn | 0.112 |
| CPU-3.O3F | 3 | Δε | +5.0 |
| PUQU-3.O2F | 6 | $\gamma_1$ (mPa · s) | 65.0 |
| PUQU-3.O3F | 6 | Cp (° C.) | 75 |
| PUQU-5.O2F | 6 | | |
| PUQU-5.O3F | 5 | | |
| PGUQU-3.O3F | 6 | | |
| CCP-V.1 | 4 | | |
| CCP-V2.1 | 3 | | |
| CC-3.V | 40 | | |
| CC-3.V1 | 3 | | |
| PGP-2.3 | 5 | | |
| PGP-2.4 | 5 | | |
| PGP-3.5 | 5 | | |

The composition has a high dielectric anisotropy, low viscosity, which is suitable for fast response and low driving voltage LCD device.

Example 3

Table 4 percentage of component and performance parameters of the liquid crystal composition of Example 3

| Component | wt % | Perameter | Value |
|---|---|---|---|
| CPU-3.O2F | 5 | Δn | 0.100 |
| CPU-3.O3F | 5 | Δε | +5.0 |
| PUQU-3.O2F | 6 | $\gamma_1$ (mPa · s) | 77 |
| PUQU-3.O3F | 6 | Cp (° C.) | 91.0 |
| PUQU-5.O2F | 6 | | |
| PUQU-5.O3F | 6 | | |
| DUQU-4.O3F | 3 | | |
| CCPU-3.O3F | 1 | | |
| CCP-V.1 | 14 | | |
| CC-3.V | 35 | | |
| CC-3.V1 | 5 | | |
| CPPC-3.3 | 4 | | |
| CGPC-3.3 | 4 | | |

The composition has a high dielectric anisotropy, low viscosity, which is suitable for fast response and low driving voltage LCD device.

Example 4

Table 5 percentage of component and performance parameters of the liquid crystal composition of Example 4

| Component | wt % | Perameter | Value |
|---|---|---|---|
| CPU-3.O2F | 5 | Δn | 0.099 |
| CPU-3.O3F | 4 | Δε | +8.0 |
| CCU-3.O2F | 3 | $\gamma_1$ (mPa · s) | 87 |
| CCU-3.O3F | 4 | Cp (° C.) | 92.0 |
| PUQU-3.O2F | 5 | | |
| PUQU-3.O3F | 5 | | |
| PUQU-5.O3F | 5 | | |
| PGUQU-3.O3F | 2 | | |
| DUQU-3.O3F | 4 | | |
| DUQU-4.O3F | 5 | | |
| DPUQU-4.O3F | 4 | | |
| CCPU-2.O3F | 3 | | |
| CCPU-3.O3F | 3 | | |
| CCPU-5.O3F | 3 | | |
| CCP-V.1 | 6 | | |
| CC-3.V | 33 | | |
| CC-3.V1 | 3 | | |
| CCP-3.OCF3 | 3 | | |

The composition has a high dielectric anisotropy, which is suitable for low driving voltage LCD device.

Example 5

Table 6 percentage of component and performance parameters of the liquid crystal composition of Example 5

| Component | wt % | Perameter | Value |
|---|---|---|---|
| CPU-3.O2F | 3 | Δn | 0.099 |
| CPU-3.O3F | 3 | Δε | +8.3 |
| PUQU-3.O3F | 4 | $\gamma_1$ (mPa · s) | 92 |
| PUQU-5.O3F | 4 | Cp (° C.) | 93.0 |
| PGUQU-3.O3F | 3 | | |
| PGUQU-5.O3F | 3 | | |
| DUQU-3.O3F | 8 | | |
| DUQU-4.O3F | 9 | | |
| DPUQU-4.O3F | 4 | | |
| CCPU-3.O3F | 4 | | |
| CCPU-5.O3F | 4 | | |
| CCP-V.1 | 11 | | |
| CC-3.V | 30 | | |
| CC-3.2V1 | 6 | | |
| CCP-3.OCF3 | 4 | | |

The composition has a high dielectric anisotropy, which is suitable for low driving voltage LCD device.

Example 6

Table 7 percentage of component and performance parameters of the liquid crystal composition of Example 6

| Component | wt % | Perameter | Value |
|---|---|---|---|
| PUQU-3.O3F | 3 | εn | 0.101 |
| PUQU-5.O3F | 2 | Δε | +9.1 |
| PGUQU-3.O3F | 2 | $\gamma_1$ (mPa · s) | 105 |
| CC-3.V | 25 | Cp (° C.) | 91.0 |
| CCU-2.F | 7 | | |
| CCU-3.F | 14 | | |
| CGU-2.F | 12 | | |
| CGU-3.F | 11 | | |
| CGPC-3.3 | 3 | | |
| CCPU-2.F | 3 | | |
| CCPU-3.F | 8 | | |
| CCPU-4.F | 4 | | |
| CCGU-3.F | 6 | | |

The composition has a high dielectric anisotropy, which is suitable for low driving voltage LCD device.

Example 7

Table 8 percentage of component and performance parameters of the liquid crystal composition of Example 7

| Component | wt % | Perameter | Value |
|---|---|---|---|
| PGU-3.O3F | 6 | Δn | 0.105 |
| CC-3.V | 25 | Δε | +7.9 |
| CCU-2.F | 11 | $\gamma_1$ (mPa · s) | 121 |
| CCU-3.F | 14 | Cp (° C.) | 95.0 |
| CGPC-3.3 | 3 | | |
| CPU-5.F | 5 | | |
| CGU-2.F | 15 | | |
| CCPU-2.F | 3 | | |
| CCPU-3.F | 8 | | |
| CCPU-4.F | 4 | | |
| CCGU-3.F | 6 | | |

Example 8

Table 9 percentage of component and performance parameters of the liquid crystal composition of Example 8

| Component | wt % | Perameter | Value |
|---|---|---|---|
| PGU-3.O3F | 5 | Δn | 0.111 |
| APU-3.O3F | 5 | Δε | +6.9 |
| PUQU-3.O3F | 4 | $\gamma_1$ (mPa · s) | 111 |
| PGUQU-3.O3F | 5 | Cp (° C.) | 105.0 |
| CC-3.V | 30 | | |
| CC-3.V1 | 10 | | |
| CCP-V.1 | 3 | | |
| CPG-3.F | 3 | | |
| CCU-3.F | 2 | | |
| CCPU-3.F | 6 | | |
| CCPU-5.F | 6 | | |
| CCGU-3.F | 5 | | |
| PGUQU-5.F | 6 | | |
| CCQU-3.F | 6 | | |
| CCQU-5.F | 4 | | |

Example 9

Table 10 percentage of component and performance parameters of the liquid crystal composition of Example 9

| Component | wt % | Perameter | Value |
|---|---|---|---|
| PGU-3.O3F | 8 | Δn | 0.112 |
| APU-3.O3F | 9 | Δε | +2.2 |
| PUQU-3.O3F | 10 | $\gamma_1$ (mPa · s) | 80.0 |
| CC-3.V | 38 | Cp (° C.) | 86.0 |
| CC-3.V1 | 10 | | |
| CCP-V.1 | 3 | | |
| CCP-V2.1 | 9 | | |
| PGP-2.3 | 5 | | |
| PGP-3.5 | 5 | | |
| CGPC-3.3 | 3 | | |

The composition has a high optical anisotropy and low rotational viscosity, which is suitable for fast response LCD device.

Example 10

Table 11 percentage of component and performance parameters of the liquid crystal composition of Example 10

| Component | wt % | Perameter | Value |
|---|---|---|---|
| PGU-3.O3F | 2 | εn | 0.098 |
| CC-3.V | 33 | Δε | +7.5 |
| CCU-2.F | 10 | $\gamma_1$ (mPa · s) | 95 |
| CCU-3.F | 10 | Cp (° C.) | 94.0 |
| CPU-5.F | 6 | | |
| CGU-2.F | 7 | | |
| CGU-3.F | 6 | | |
| CCPU-2.F | 6 | | |
| CCPU-3.F | 7 | | |
| CCPU-4.F | 7 | | |
| CCGU-3.F | 6 | | |

Example 11

Table 12 percentage of component and the performance parameters of the liquid crystal composition of Example 11

| Component | wt % | Perameter | Value |
|---|---|---|---|
| PUQU-3.O3F | 8 | Δn | 0.099 |
| CC-3.V | 15 | Δε | +9.0 |
| CCP-V.1 | 7 | $\gamma_1$ (mPa · s) | 125 |
| CCU-2.F | 7 | Cp (° C.) | 96.0 |
| CCU-3.F | 7 | | |
| CCU-5.F | 7 | | |
| CPPC-3.3 | 3 | | |
| CPU-3.F | 7 | | |
| CPU-5.F | 8 | | |
| CCPU-3.F | 2 | | |
| CCPU-5.F | 2 | | |
| CCGU-3.F | 6 | | |
| CCQU-3.F | 8 | | |
| CCQU-5.F | 8 | | |
| CUQU-3.F | 5 | | |

Example 12

Table 13 percentage of component and performance parameters of the liquid crystal composition of Example 12

| Component | wt % | Perameter | Value |
|---|---|---|---|
| PGU-3.O3F | 8 | Δn | 0.119 |
| APU-3.O3F | 8 | Δε | +9.0 |
| CC-5.V | 13 | $\gamma_1$ (mPa · s) | 150 |

-continued

| Component | wt % | Perameter | Value |
|---|---|---|---|
| CC-3.V1 | 4 | Cp (° C.) | 110.0 |
| CPU-3.F | 23 | | |
| CCG-2.F | 3 | | |
| CCG-3.F | 3 | | |
| CCG-5.F | 3 | | |
| CCPU-2.F | 4 | | |
| CCPU-3.F | 4 | | |
| CCPU-4.F | 4 | | |
| CCPU-5.F | 4 | | |
| CCQU-3.F | 19 | | |

Example 13

Table 14 percentage of component and performance parameters of the liquid crystal composition of Example 13

| Component | wt % | Perameter | Value |
|---|---|---|---|
| PGU-3.O3F | 5 | $\Delta n$ | 0.119 |
| PUQU-3.O3F | 7 | $\Delta \varepsilon$ | +4.8 |
| CC-3.V | 44 | $\gamma_1$ (mPa · s) | 65 |
| CCP-V.1 | 9 | Cp (° C.) | 82.0 |
| PGP-2.3 | 7 | | |
| PGP-2.4 | 6 | | |
| CPP-3.2 | 7 | | |
| APUQU-2.F | 7 | | |
| APUQU-3.F | 8 | | |

Example 14

Table 15 percentage of component and performance parameters of the liquid crystal composition of Example 14

| Component | wt % | Perameter | Value |
|---|---|---|---|
| PGU-3.O3F | 7 | $\Delta n$ | 0.107 |
| APU-3.O3F | 3 | $\Delta \varepsilon$ | +7.0 |
| CC-3.V | 33 | $\gamma_1$ (mPa · s) | 87 |
| CC-3.V1 | 10 | Cp (° C.) | 96.0 |
| CGU-3.F | 5 | | |
| CCPU-3.F | 3 | | |
| CCPU-5.F | 5 | | |
| CCGU-3.F | 5 | | |
| CCP-3.OCF3 | 7 | | |
| CCP-5.OCF3 | 9 | | |
| PGUQU-3.F | 5 | | |
| PGUQU-5.F | 4 | | |
| PUQU-3.F | 4 | | |

Example 15

Table 16 percentage of component and performance parameters of the liquid crystal composition of Example 15

| Component | wt % | Perameter | Value |
|---|---|---|---|
| DUQU-3.O3F | 10 | $\Delta n$ | 0.110 |
| CCG-V.F | 5 | $\Delta \varepsilon$ | +9.2 |
| CC-5.V | 14 | $\gamma_1$ (mPa · s) | 125 |
| CC-3.V1 | 8 | Cp (° C.) | 96.0 |
| PGP-2.4 | 8 | | |
| CPPC-3.3 | 3 | | |
| CCPU-2.F | 4 | | |
| CCPU-3.F | 5 | | |

-continued

| Component | wt % | Perameter | Value |
|---|---|---|---|
| CCGU-3.4 | 5 | | |
| CCP-3.OCF3 | 5 | | |
| CCP-5.OCF3 | 5 | | |
| CCU-3.OCHF2 | 10 | | |
| CUQU-3.F | 10 | | |
| PUQU-3.F | 8 | | |

Example 16

Table 17 percentage of component and performance parameters of the liquid crystal composition of Example 16

| Component | wt % | Perameter | Value |
|---|---|---|---|
| APU-3.O3F | 5 | $\Delta n$ | 0.138 |
| PUQU-3.O3F | 10 | $\Delta \varepsilon$ | +8.9 |
| PGUQU-3.O3F | 4 | $\gamma_1$ (mPa · s) | 135 |
| CC-3.V | 20 | Cp(° C.) | 97.0 |
| PGP-2.3 | 5 | | |
| PGP-2.4 | 4 | | |
| PGP-3.5 | 3 | | |
| CPU-3.F | 9 | | |
| CGU-2.F | 10 | | |
| CGU-3.4 | 8 | | |
| CCPU-2.F | 4 | | |
| CCPU-3.F | 8 | | |
| CCPU-4.F | 4 | | |
| CCGU-3.F | 6 | | |

Example 17

Table 18 percentage of component and performance parameters of the liquid crystal composition of Example 17

| Component | wt % | Perameter | Value |
|---|---|---|---|
| DUQU-3.03F | 5 | $\Delta n$ | 0.095 |
| PGUQU-3.O3F | 6 | $\Delta \varepsilon$ | +2.0 |
| CC-3.V | 43 | $\gamma_1$ (mPa · s) | 42 |
| CC-3.V1 | 12 | Cp(° C.) | 75.0 |
| PP-1.2V | 7 | | |
| CCP-V.1 | 10 | | |
| CCP-V2.1 | 10 | | |
| PGP-2.3 | 7 | | |

Example 18

Table 19 percentage of component and performance parameters of the liquid crystal composition of Example 18

| Component | wt % | Perameter | Value |
|---|---|---|---|
| PUQU-3.O3F | 15 | $\Delta n$ | 0.102 |
| CC-3.V | 43 | $\Delta \varepsilon$ | +7.0 |
| CCP-V.1 | 10 | $\gamma_1$ (mPa · s) | 77 |
| PPGU-3.F | 2 | Cp(° C.) | 86.0 |
| CCP-3.OCF3 | 10 | | |
| CPGU-3.OCF3 | 10 | | |
| APUQU-2.F | 10 | | |

Example 19

Table 20 percentage of component and performance parameters of the liquid crystal composition of Example 19

| Component | wt % | Perameter | Value |
|---|---|---|---|
| PGU-3.O3F | 10 | Δn | 0.134 |
| CC-3.V | 48 | Δε | +2.0 |
| CC-3.V1 | 9 | γ₁ (mPa · s) | 65 |
| PGP-1.2V | 10 | Cp(° C.) | 82.0 |
| PGP-2.2V | 10 | | |
| PGP-3.2V | 10 | | |
| PGUQU-3.F | 3 | | |

Example 20

Table 21 percentage of component and performance parameters of the liquid crystal composition of Example 20

| Component | wt % | Perameter | Value |
|---|---|---|---|
| PGU-3.O3F | 4 | Δn | 0.102 |
| APU-3.O3F | 9 | Δε | +5.3 |
| CC-3.V | 27 | γ₁ (mPa · s) | 90 |
| CC-3.V1 | 5 | Cp(° C.) | 98.0 |
| CCP-V.1 | 13 | | |
| CCP-V2.1 | 11 | | |
| CCG-V.F | 6 | | |
| CCU-3.F | 4 | | |
| CGU-3.F | 7 | | |
| CCGU-3.F | 7 | | |
| PUQU-3.F | 7 | | |

Example 21

Table 22 percentage of component and performance parameters of the liquid crystal composition of Example 21

| Component | wt % | Perameter | Value |
|---|---|---|---|
| APU-3.O3F | 6 | Δn | 0.100 |
| PUQU-3.O3F | 8 | Δε | +6.0 |
| DUQU-3.O3F | 8 | γ₁ (mPa · s) | 108 |
| PGUQU-3.O3F | 6 | Cp(° C.) | 85.6 |
| APUQU-3.O3F | 4 | | |
| CUQU-3.O3F | 9 | | |
| CC-3.V | 30 | | |
| CC-3.V1 | 6 | | |
| CCP-V.1 | 11 | | |
| CCP-3.OCF3 | 4 | | |
| CCPU-2.F | 4 | | |
| CCPU-3.F | 4 | | |

Example 22

Table 23 percentage of component and performance parameters of the liquid crystal composition of Example 22

| Component | wt % | Perameter | Value |
|---|---|---|---|
| PUQU-3.O3F | 15 | Δn | 0.106 |
| DUQU-3.O3F | 9 | Δε | +5.8 |
| PGUQU-3.O3F | 2 | γ₁ (mPa · s) | 102 |
| APUQU-3.O3F | 4 | Cp(° C.) | 87.9 |
| CCU-3.O3F | 7 | | |
| CPU-3.O3F | 9 | | |
| CC-3.V | 33 | | |
| CC-3.V1 | 3 | | |
| CCP-V.1 | 6 | | |
| CCP-3.OCF3 | 3 | | |
| CCPU-2.F | 3 | | |
| CCPU-3.F | 3 | | |
| CCPU-4.F | 3 | | |

Example 23

Table 24 percentage of component and performance parameters of the liquid crystal composition of Example 23

| Component | wt % | Perameter | Value |
|---|---|---|---|
| PUQU-3.O3F | 12 | Δn | 0.115 |
| PGUQU-3.O3F | 10 | Δε | +4.8 |
| CC-3.V | 45 | γ₁ (mPa · s) | 80 |
| PGP-2.3 | 10 | Cp(° C.) | 82.0 |
| PGP-2.4 | 4 | | |
| CCU-3.F | 10 | | |
| CCPU-2.F | 3 | | |
| CCPU-3.F | 3 | | |
| CCPU-4.F | 3 | | |

Example 24

Table 25 percentage of component and performance parameters of the liquid crystal composition of Example 24

| Component | wt % | Perameter | Value |
|---|---|---|---|
| PUQU-3.O3F | 16 | Δn | 0.101 |
| APUQU-3.O3F | 14 | Δε | +8.4 |
| CC-3.V | 24 | γ₁ (mPa · s) | 125 |
| CCP-V.1 | 9 | Cp(° C.) | 100.0 |
| CCU-2.F | 5 | | |
| CCU-3.F | 10 | | |
| CCP-3.OCF3 | 5 | | |
| CPGU-3.OCF3 | 4 | | |
| CCQU-3.F | 13 | | |

The composition has a relatively high clearing point, which is suitable for increasing working temperature range of the LCD.

Example 25

Table 26 percentage of component and performance parameters of the liquid crystal composition of Example 25

| Component | wt % | Perameter | Value |
|---|---|---|---|
| DUQU-3.O3F | 13 | Δn | 0.112 |
| CCU-3.O3F | 5 | Δε | +11.2 |
| CPU-3.O3F | 10 | γ₁ (mPa · s) | 125 |
| CC-3.V | 24 | Cp(° C.) | 90.0 |
| CCP-V.1 | 9 | | |
| CCP-3.OCF3 | 5 | | |
| CPGU-3.OCF3 | 4 | | |
| CCPU-2.F | 4 | | |
| PUQU-3.F | 12 | | |
| APUQU-3.F | 14 | | |

The composition has a very high dielectric anisotropy, which is suitable for low driving voltage LCD device.

Example 26

Table 27 percentage of component and performance parameters of the liquid crystal composition of Example 26

| Component | wt % | Perameter | Value |
|---|---|---|---|
| PUQU-3.O3F | 6 | Δn | 0.106 |
| PGUQU-3.O3F | 7 | Δε | +5.8 |

-continued

| Component | wt % | Perameter | Value |
|---|---|---|---|
| APUQU-3.O3F | 5 | $\gamma_1$ (mPa · s) | 115 |
| AUQU-3.O3F | 5 | Cp(° C.) | 110.0 |
| CC-3.V | 34 | | |
| CC-3.V1 | 5 | | |
| CCP-V.1 | 10 | | |
| CCU-3.F | 3 | | |
| CPPC-3.3 | 4 | | |
| CCPU-4.F | 3 | | |
| CCP-3.OCF3 | 3 | | |
| CCP-5.OCF3 | 3 | | |
| CCGU-3.F | 5 | | |
| CPGU-3.OCF3 | 7 | | |

The composition has a relatively high clearing point, which is suitable for increasing working temperature range of the LCD.

Example 27

Table 28 percentage of component and performance parameters of the liquid crystal composition of Example 27

| Component | wt % | Perameter | Value |
|---|---|---|---|
| DUQU-3.O3F | 13 | $\Delta n$ | 0.102 |
| CCU-3.O3F | 5 | $\Delta\varepsilon$ | +9.8 |
| CPU-3.O3F | 10 | $\gamma_1$ (mPa · s) | 102 |
| CC-3.V | 24 | Cp(° C.) | 88.0 |
| CCP-V.1 | 9 | | |
| CCW-3.O2 | 9 | | |
| CPGU-3.OCF3 | 4 | | |
| CCPU-2.F | 4 | | |
| PUQU-3.F | 12 | | |
| APUQU-3.F | 10 | | |

The composition has a relatively high dielectric anisotropy. Due to the addition of the monomer with negative dielectric anisotropy, it will remarkably improve the transmittance of LCD.

Comparative Example 1

Table 29 liquid crystal composition and performance parameters without addition of formula I

| Component | wt % | Perameter | Value |
|---|---|---|---|
| CCU-3.F | 15 | $\Delta n$ | 0.095 |
| CC-3.V | 43 | $\Delta\varepsilon$ | +5.5 |
| CCP-V.1 | 10 | $\gamma_1$ (mPa · s) | 75 |
| PPGU-3.F | 2 | Cp(° C.) | 85.0 |
| CCP-3.OCF3 | 10 | | |
| CPGU-3.OCF3 | 10 | | |
| APUQU-2.F | 10 | | |

Compared the example 18 with the comparative Example 1, the only difference is that the former utilizes PUQU-3.O3F to replace the latter's CCU-3.F and the rest components are remaining unchanged. One may notice that after addition of compound of formula I, the optical anisotropy gains from 0.095 to 0.102, and the dielectric anisotropy from 5.5 to 7.0 while other properties essentially remain the same. As a result, the display driving voltage is decreased and the response speed is increased.

Comparative Example 2

Table 30 the percentage of component and performance parameters of the liquid crystal composition for TFT display

| Component | wt % | Perameter | Value |
|---|---|---|---|
| CCG-2.F | 13 | $\Delta n$ | 0.0991 |
| CCG-3.F | 14 | $\Delta\varepsilon$ | +4.8 |
| CCG-4.F | 12 | $\gamma_1$ (mPa · s) | 119 |
| CCG-5.F | 10 | Cp(° C.) | 79.5 |
| 3CPG-3.F | 9 | | |
| CPG-4.F | 6 | | |
| CPG-5.F | 13 | | |
| CP-7.F | 4 | | |
| CCU-2.OCF2H | 3 | | |
| CPU-3.F | 2 | | |
| PTG-2.F | 2 | | |
| CP-5.Cl | 7 | | |
| CP-3.O1 | 5 | | |

Compared with the TFT liquid crystal composition introduced in comparative Example 2, the compositions of the present invention are of significantly higher dielectric anisotropy and lower viscosity $\gamma_1$, thereby reduce the driving voltage, viscosity as well as power consumption of the system, while improve the response speed.

It is concluded that the above embodiments of the present invention is based on the special task for TN, ADS, FFS or IPS display medium. Specifically, the liquid crystal medium not only has a fast response time, a low rotational viscosity and a high birefringence but also has a high clearing point and a suitable dielectric anisotropy.

In addition, except where noted (some compounds of formula I), liquid crystal compounds wherein the liquid crystal composition used in the present invention, are known substances, and its structure and availability (either commercially available or synthesis) are well-known in the prior art. Due to space constraints, herein the applicant only introduces the preparation of a compound as shown in Example 28.

Example 28

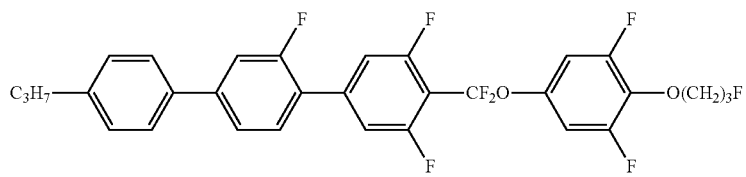

PGUQU-3.O3F (Compound 3) Synthesis
Synthesis of 1) Onium Trifluoromethyl Sulfonate (Compound 2)

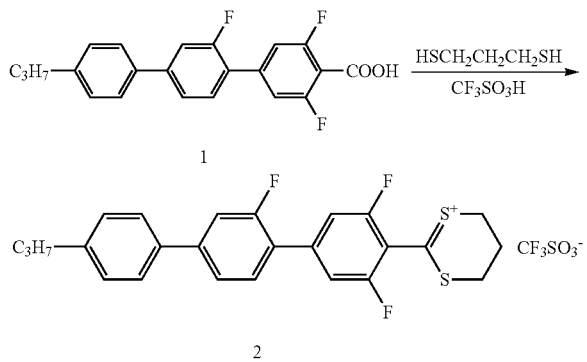

137 g 3,5,2'-trifluoro-4"-propyl-[1,1'; 4',1"] terphenyl-4-carboxylic acid (Compound 1), 47 mL 1,3-propanedithiol, 42 mL trifluoromethanesulfonic acid, 145 mL of toluene and 145 mL isooctane were added into a 1 L three-necked flask with a water separator mounted at one side opening. The reactants were heated to reflux for 6 hours, slowly cooled down to 0° C., and the product was subject to suction filtration to obtain a solid. The solid was dried for further feeding.

2) Synthesis of 4-{[3,5-difluoro-4-(3-fluoro-propoxy)-phenoxy]-methyl}-3,5-difluoro-difluoro-4'-propyl biphenyl (compound 3)

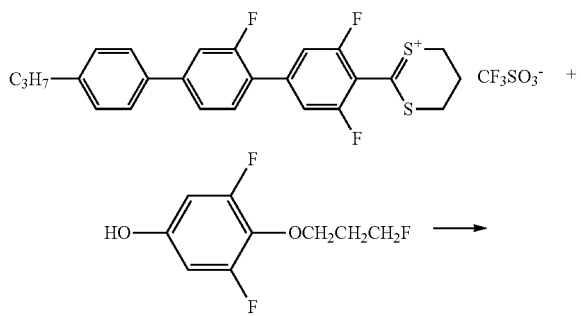

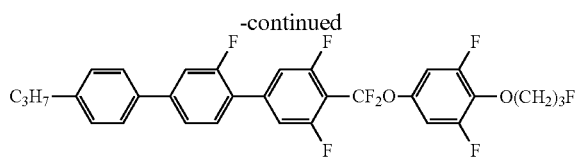

200 mL of methylene chloride, 39 ml triethylamine and 57.7 g 3,5-difluoro-4-(3-fluoro-propoxy)-phenol (Compound 2) were added into 2 L three-necked flask, cooled to 20° C., added with a solution composed of 142 g onium trifluoromethyl sulfonate (compound 2) and 400 mL of methylene chloride and stirred for 1 hour. Then 77 g hydrogen fluoride triethylamine was added dropwise at −75° C., stirring was continued for 1 hour. The temperature was controlled below −75° C., a solution composed of 15 mL bromine and 30 mL of methylene chloride was re-warmed to −10° C. and subjected to post-processing. 1 L of water was added into a 10 L bucket, the stirring was started, the reaction solution was poured and stirred for minutes, solid sodium bicarbonate was added slowly (a large amount of gas was generated) until the PH value of the solution was nearly neutral, standing for liquid separation, the aqueous phase was extracted once with 500 ml dichloromethane, the organic phases were combined, and the solvent was spin-dried at 70° C. to give a solid, recrystallization was carried out with 2-fold ethanol and 1-fold toluene for three times and the suction-filtration and air-drying were performed to obtain a white solid. Theoretical production: 139.2 g, actual production: 144.1 g, a yield of 82.0%.

Gas chromatographic (GC) purity: 99.9%,
Melting point: 80.2° C.,
clearing point: 170.2° C.
Δn: 0.200,
Δε: 21.0
γ1: 245 mPa·s.
Mass spectrometry fragmentation: 173,346,375,580 (molecular ion peak);
NMR spectrum H-NMR (CDCl3, 300 mhZ): δH: 0.90-2.60 (m, 9H), 3.90-4.10 (m, 4H), 6.10-7.30 (m, 11H).

According to the embodiment of the technical solution of example 28, the simple replacement of a raw material containing the corresponding group of the following compounds can be synthesized by those skilled in the art, so there is no specific limitation in the present invention:

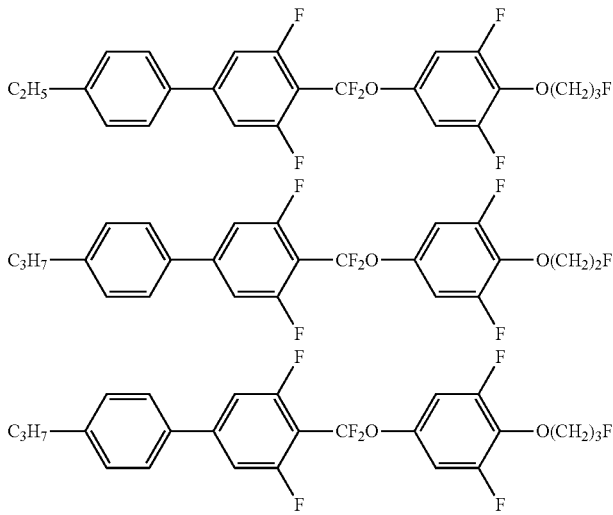

-continued
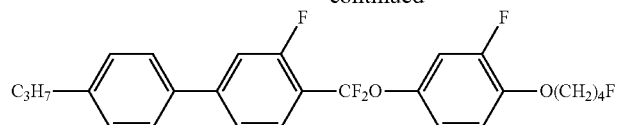
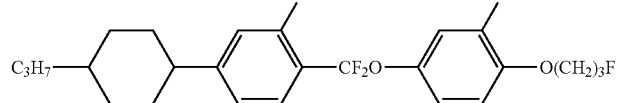
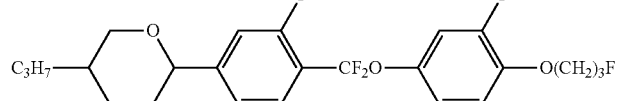
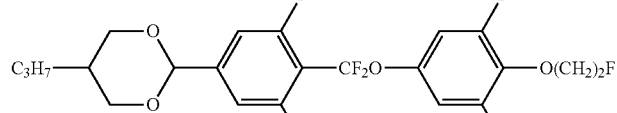
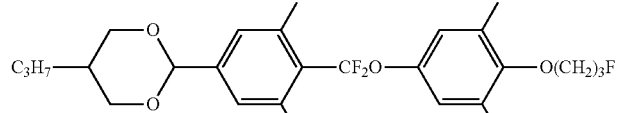
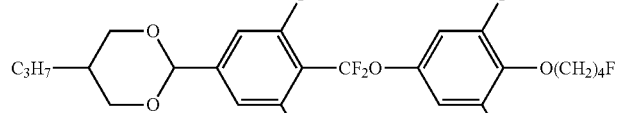
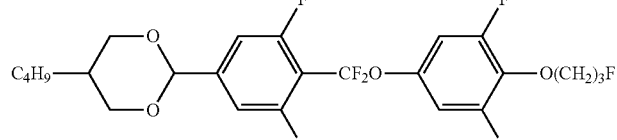
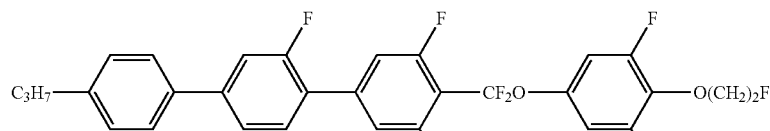
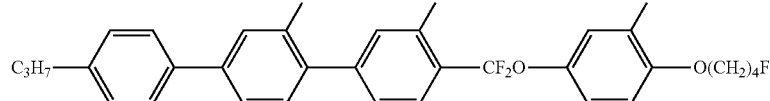
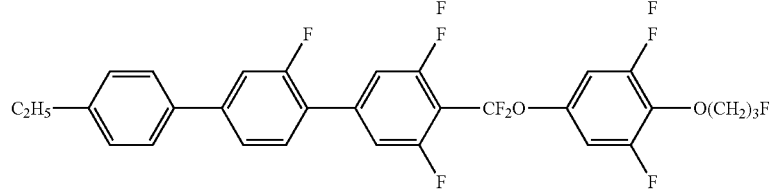

-continued
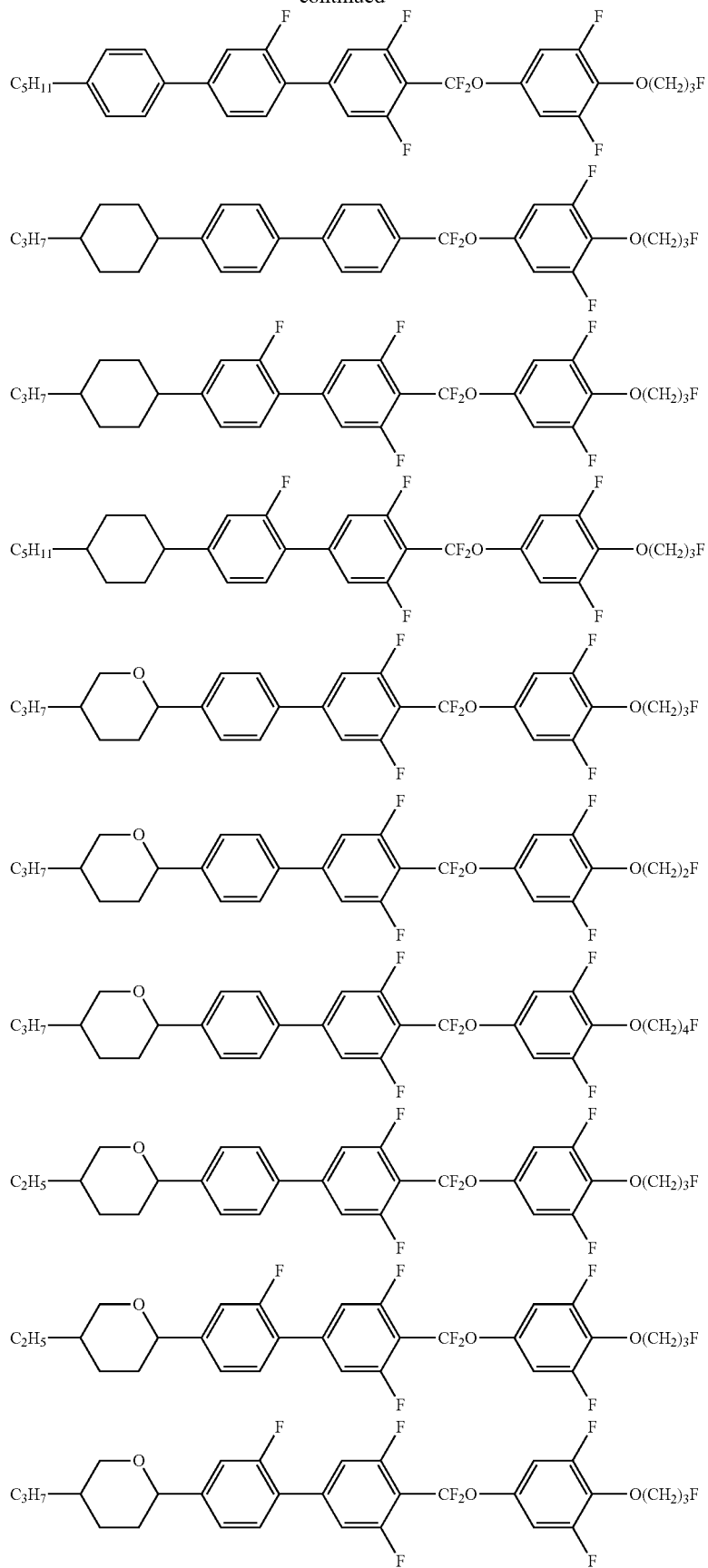

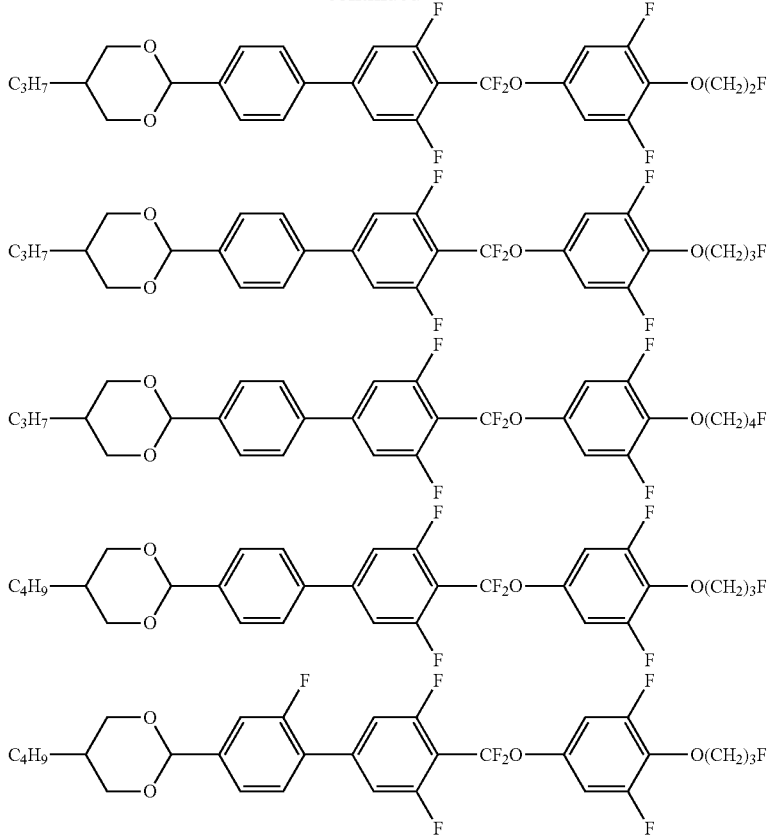

Although general explanations and specific embodiments have been described in detail in the present invention, it is obvious to a person skilled in the art that some modifications or improvements could be made based upon the present invention. Therefore, all these modifications or improvements without departing from the spirit of the invention might belong to the scope claimed in the invention.

INDUSTRIAL APPLICABILITY

The liquid crystal composition of the present invention has characteristics of low viscosity, high resistivity, good low-temperature mutual solubility, fast response and excellent transmission, which can be used for a variety of fast response display modes. The working temperature of a LCD is subject to the temperature range of liquid crystal. Information can only be displayed in a specific temperature range of liquid crystal phase. At low temperature, the viscosity of liquid crystal increases exponentially, a hurdle of LCD, which substantially reduces the response speed and overall performances of LCD. The liquid crystal composition according to the present invention overcomes these problems. Characterized by its low viscosity, good low-temperature performance and excellent transmission, the liquid crystal composition is applicable in TN, IPS or FFS displays with remarkably improved performances.

What is claimed is:
1. A liquid crystal composition for LCD device comprising:
    a) 3-50 weight percents of one or more compounds represented by the general formula I;
    b) 20-80 weight percents of one or more compounds represented by the general formula II to III;
    c) 5-50 weight percents of one or more compounds represented by the general formula IV to XIII;
    d) 1-15 weight percents of one or more compounds represented by the general formula XIV to XVI;
    e) 1-25 weight percents of one or more compounds represented by the general formula XVII to XXI;
    wherein the above a) to e) sum to 100%;

$$R\text{-}A_1\text{-}Z_1\text{-}A_2\text{-}Z_2\text{-}A_3\text{-}Z_3\text{-}A_4\text{-}Z_4\text{-}A_5\text{-}O(CH_2)nF \qquad I$$

wherein, R is selected from H and unsubstituted or substituted alkyl or alkoxy containing 1 to 12 carbon atoms, one or more $CH_2$ groups thereof being independently replaced by —C≡C—, —$CF_2O$—, —CH═CH—, —O—, —CO—O—, —O—CO— in a manner of not directly being bonded each other to oxygen atoms, and one or more H atoms thereof being replaced by halogen;

$A_1, A_2, A_3, A_4$ and $A_5$ are each independently selected from: a single bond; 1,3-cyclopentylene, 1,4-cyclohexylene, 1,4-cyclohexenyl; 1,4-piperidine group; 1,4-bicyclo [2.2.2] octyl; 1,4-phenylene, naphthalene-2,6-diyl; trans-decalin-2, 6-diyl; tetrahydronaphthalene-2,6-diyl; indan; indene; phenanthrenyl and dibenzofuran; wherein 1,4-cyclohexylene, one or two nonadjacent $CH_2$ thereof being replaced by O or S; 1,4-phenylene, one or two nonadjacent CH being replaced by N; and hydrogen may independently be substituted with halogen in each case; while $A_1, A_2, A_3, A_4$ and $A_5$ cannot be all a single bond;

$Z_1, Z_2, Z_3$ and $Z_4$ are each independently selected from: a single bond, —$(CH_2)_2$—, —$(CH_2)_4$—, —CH═

CHCH$_2$CH$_2$—, —CH$_2$CH$_2$CH=CH—, CF$_2$O, OCF$_2$, CF$_2$CF$_2$, CF=CF, CH$_2$CF$_2$, CF$_2$CH$_2$, OCF$_2$CF$_2$O, C$_2$H$_4$CF$_2$O, CH$_2$CF$_2$OCH$_2$, CH$_2$OCF$_2$CH$_2$, OCF$_2$C$_2$H$_4$, C$_3$H$_6$O, OC$_3$H$_6$, C$_2$H$_4$OCH$_2$, CH$_2$OC$_2$H$_4$, CH$_2$O, OCH$_2$, —CH=CH—, —C≡C— and COO;
n is 2, 3 or 4;
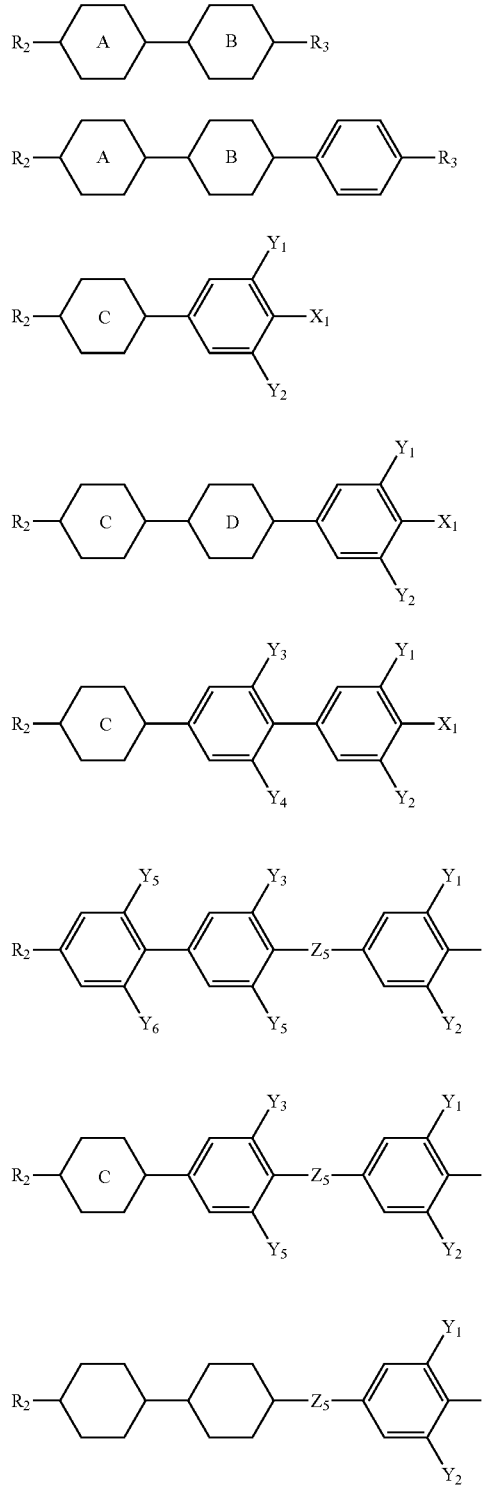
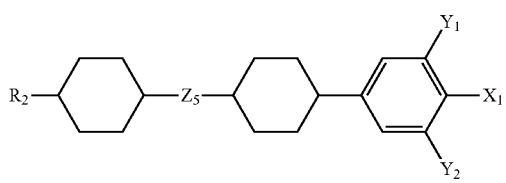
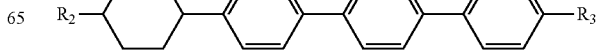

-continued

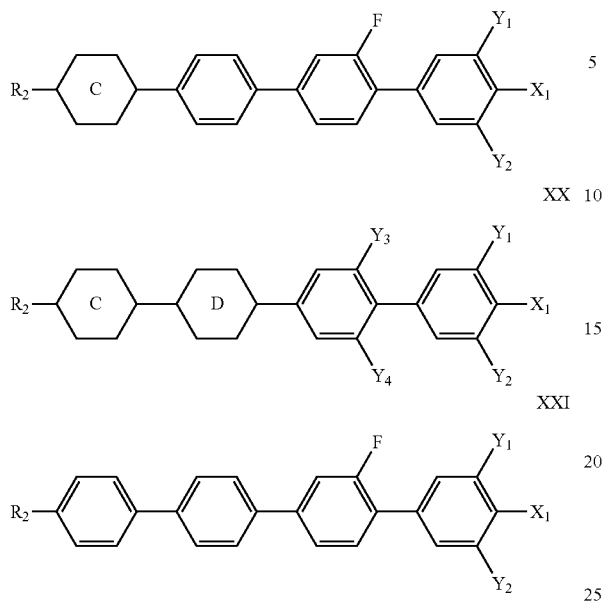

wherein,
$R_2$ and $R_3$ are each independently selected from: alkyl or alkoxy containing 1-7 carbon atoms, one or more $CH_2$ groups thereof may each, independently be replaced by —CH=CH— and one or more H atoms thereof may be replaced by fluorine element;
A and B are each independently selected from 1,4-cyclohexylene; 1,4-phenylene, one or more H atoms thereof may also be replaced by fluorine element;
C and D are each independently selected from 1,4-cyclohexylene, one or two nonadjacent —$CH_2$— thereof may be replaced by O;
$Y_1$-$Y_7$ each independently denotes H or F;
$Z_5$ denotes a single bond, —$C_2H_4$—, —$(CH_2)_4$—, —CH=CH, —CF=CF, —$C_2F_4$—, —$CH_2CF_2$—, —$CF_2CH_2$—, —$CH_2O$—, —$OCH_2$, —COO—, —$CF_2O$— or —$OCF_2$—;
$X_1$ denotes F, $OCF_3$, $OCHF_2$, $CF_3$, $CF_2H$, Cl, OCH=$CF_2$ or $OCF_2CF$=$CF_2$.

2. The liquid crystal composition according to claim 1, wherein the composition comprises the following components:
a) 5 to 50 weight percents of one or more compounds represented by the general formula I;
b) 20 to 60 weight percents of one or more compounds represented by the general formula II to III;
c) 10 to 50 weight percents of one or more compounds represented by the general formula IV to XIII;
d) 3 to 15 weight percents of one or more compounds represented by the general formula XIV to XVI;
e) 3 to 20 weight percents of one or more compounds represented by the general formula XVII to XXI;
wherein the above a) to e) sum to 100%;
or
a) 10 to 38 weight percents of one or more compounds represented by the general formula I;
b) 23 to 42 weight percents of one or more compounds represented by the general formula II to III;
c) 34 to 45 weight percents of one or more compounds represented by the general formula IV to a XIII;
d) 1 to 12 weight percents of one or more compounds represented by the general formula XIV to XVI;
e) 1 to 8 weight percents of one or more compounds represented by the general formula XVII to XXI;
wherein the above a) to e) sum to 100%;
or
a) 28 to 46 weight percents of one or more compounds represented by the general formula I;
b) 23 to 56 weight percents of one or more compounds represented by the general formula II to III;
c) 5 to 20_weight percents of one or more compounds represented by the general formula IV to a XIII;
d) 8 to 14 weight percents of one or more compounds represented by the general formula XIV to XVI;
e) 8 to 19 weight percents of one or more compounds represented by the general formula XVII to XXI;
wherein the above a) to e) sum to 100%;
or
a) 15 to 41 weight percents of one or more compounds represented by the general formula I;
b) 20 to 42 weight percents of one or more compounds represented by the general formula II to III;
c) 22 to 33 weight percents of one or more compounds represented by the general formula IV to XIII;
d) 14 to 15 weight percents of one or more compounds represented by the general formula XIV to XVI;
e) 3 to 24 weight percents of one or more compounds represented by the general formula XVII to XXI;
wherein the above a) to e) add up to 100%.

3. The liquid crystal composition according to claim 2, wherein the compound is represented by the general formula I, wherein:
R is selected from H and unsubstituted or substituted alkyl or alkoxy containing 1 to 7 carbon atoms, one or more CH2 groups thereof independently being replaced by —CH=CH—, —O—, in a manner of not directly being bonded each other to oxygen atoms, and one or more H atoms thereof being replaced by halogen;
$A_1$, $A_2$, $A_3$, $A_4$ and $A_5$ are each independently selected from: a single bond; 1,3-cyclopentylene, 1,4-cyclohexylene, 1,4-cyclohexenyl; 1,4-phenylene, naphthalene-2,6-diyl; trans-decalin-2,6-diyl; tetrahydronaphthalene-2,6-diyl; indan; 1,4-cyclohexylene, one or two $CH_2$ nonadjacent thereof being replaced by 0 or S; 1,4-phenylene one or two CH nonadjacent being replaced by N; and hydrogen may independently be substituted with halogen in each case; while $A_1$, $A_2$, $A_3$, $A_4$ and $A_5$ cannot be all a single bond;
$Z_1$, $Z_2$, $Z_3$ and $Z_4$ are each independently selected from: a single bond, —$(CH_2)_2$—, —$(CH_2)_4$—, $CF_2O$, $OCF_2$, CF=CF, $CH_2CF_2$, $CF_2CH_2$, $CH_2O$, $OCH_2$, —CH=CH—;
n is 2, 3 or 4.

4. The liquid crystal composition according to claim 2, wherein the composition comprises compounds represented by the general formula I selected from the compounds represented by one or more of:

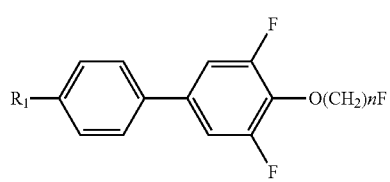

I1

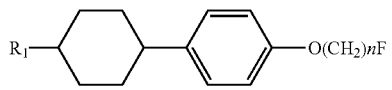

I2

-continued
I3
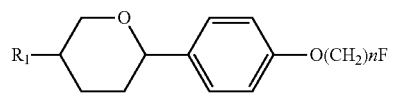
I4
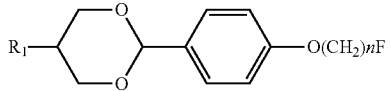
I5
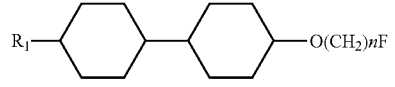
I6
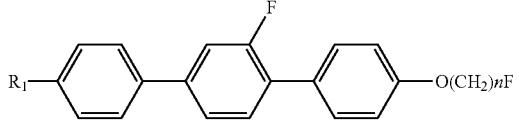
I7
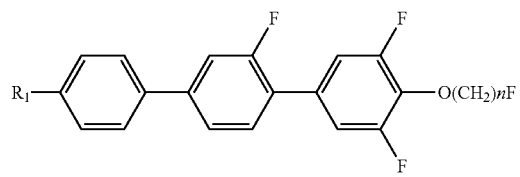
I8
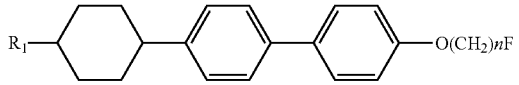
I9
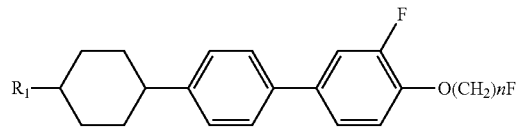
I10
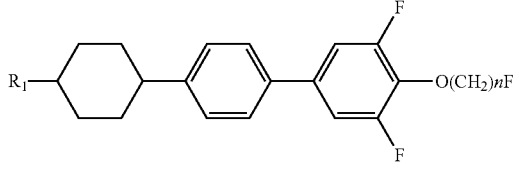
I11
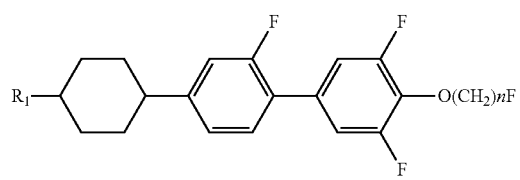
I12
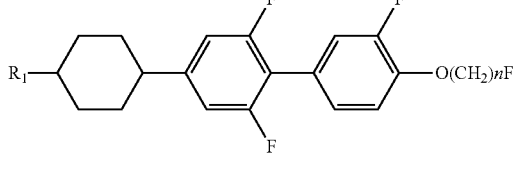
I13
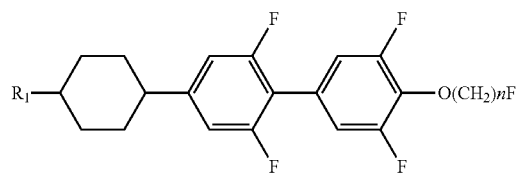
I14
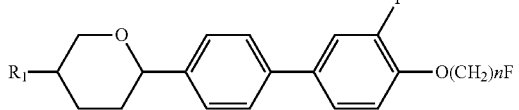
I15
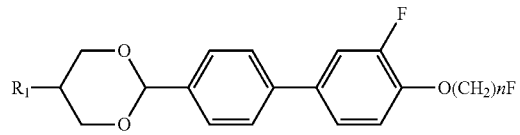
I16
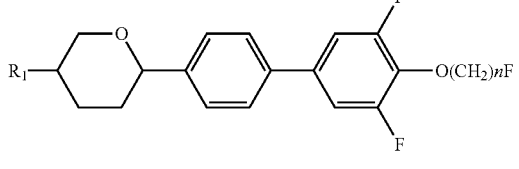
I17
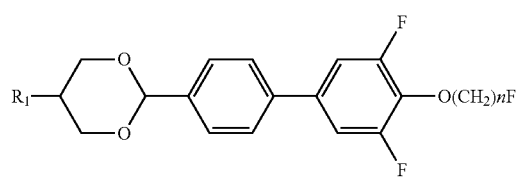
I18
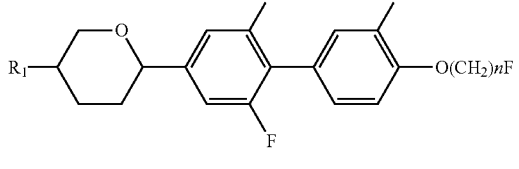
I19
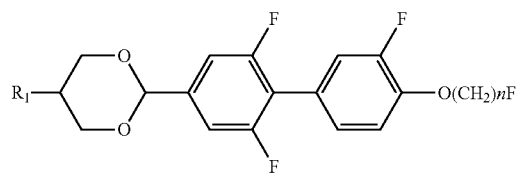
I20
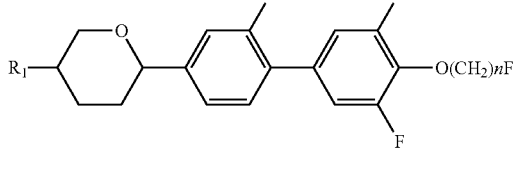

-continued
I21 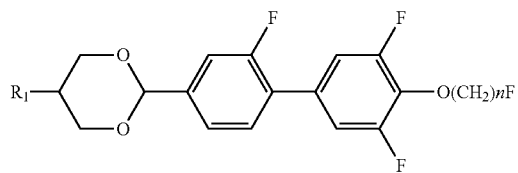
I22 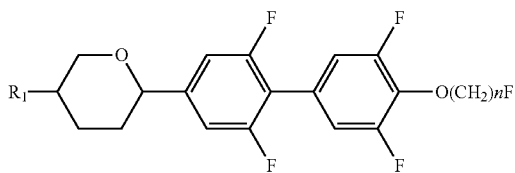
I23 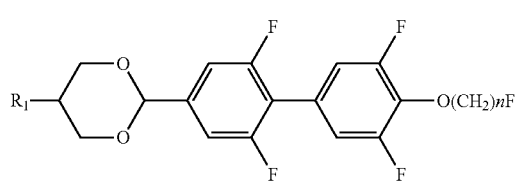
I24 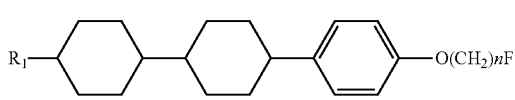
I25 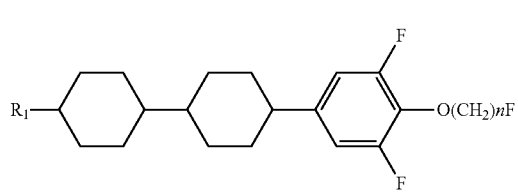
I26 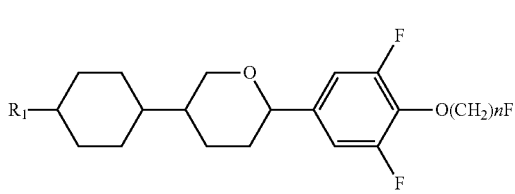
I27 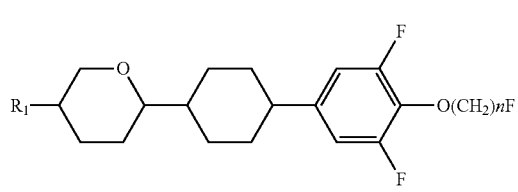
I28 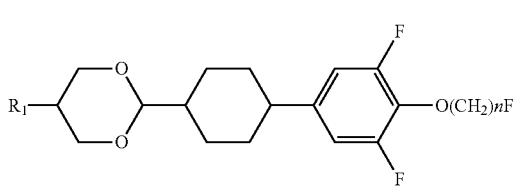
I29 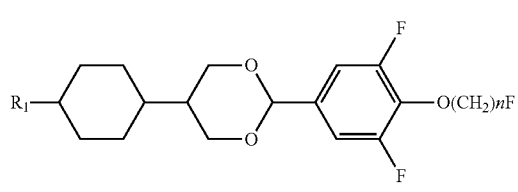
I30 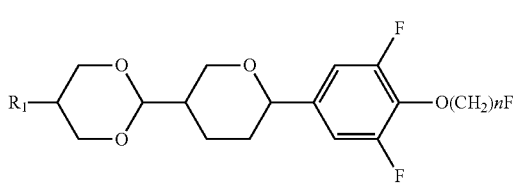
I31 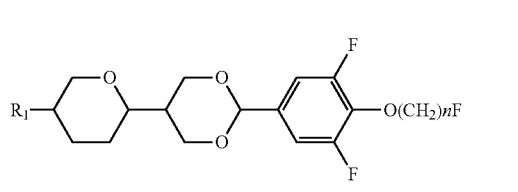
I32 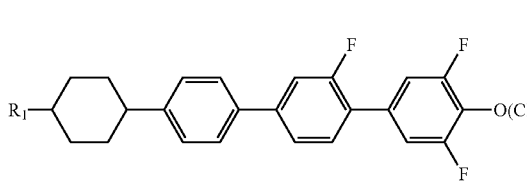
I33 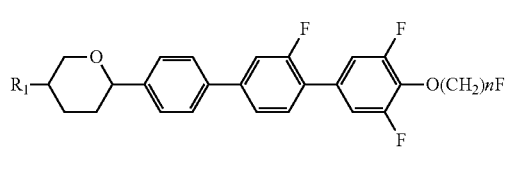
I34 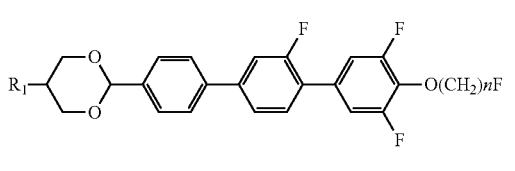
I35 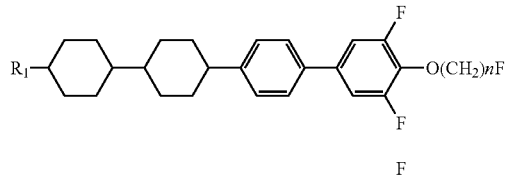
I36 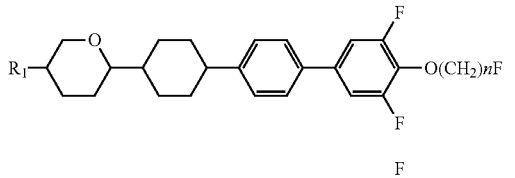
I37 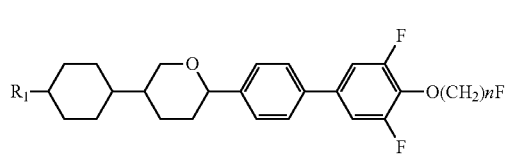
I38 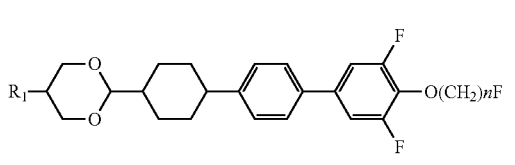

-continued
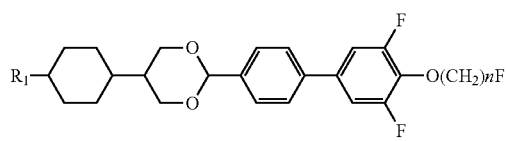 I39
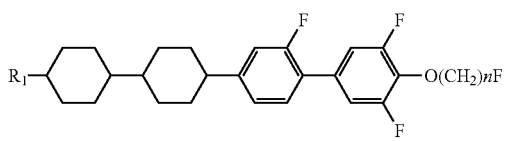 I40
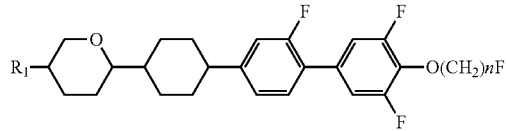 I41
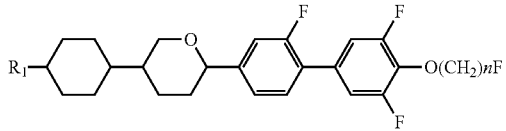 I42
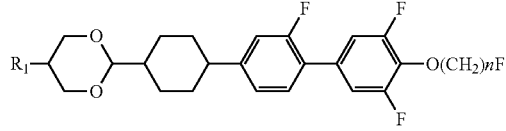 I43
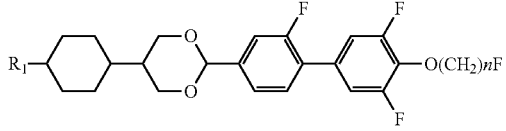 I44
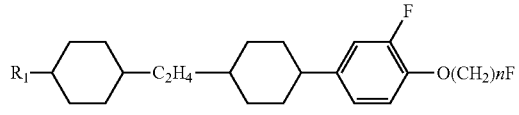 I45
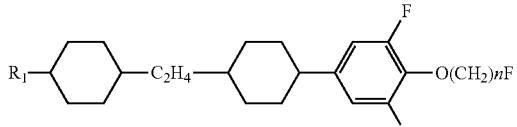 I46
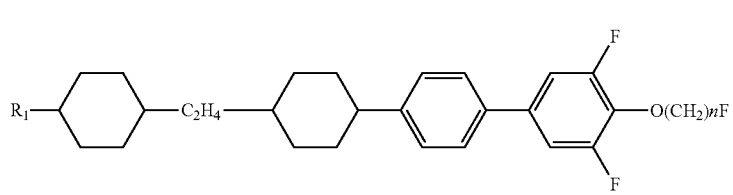 I47
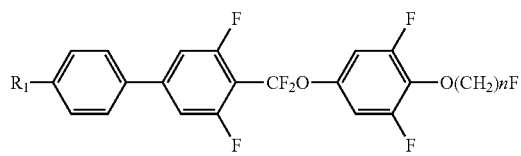 I48
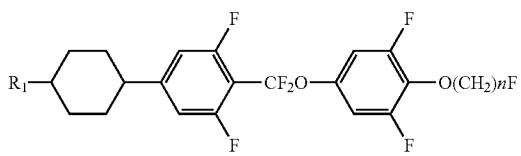 I49
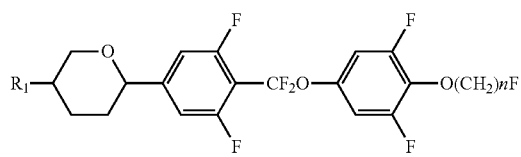 I50
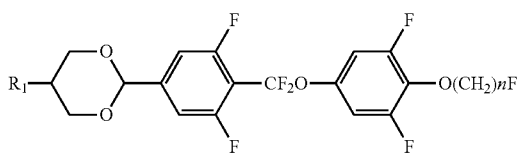 I51
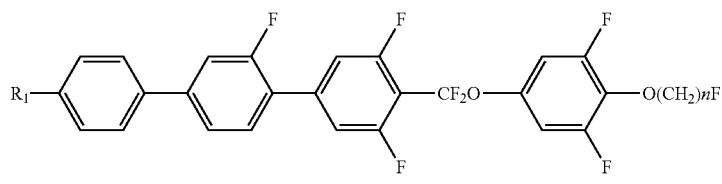 I52
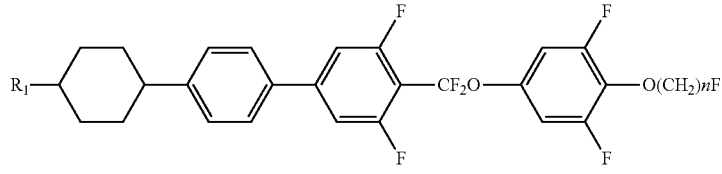 I53
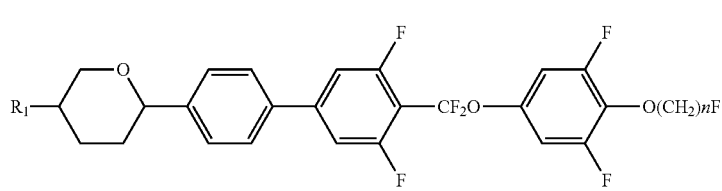 I54

-continued
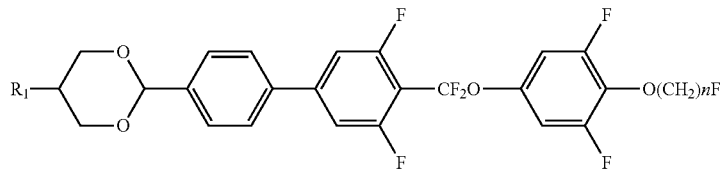
I55
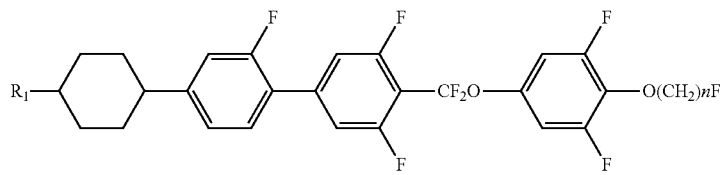
I56
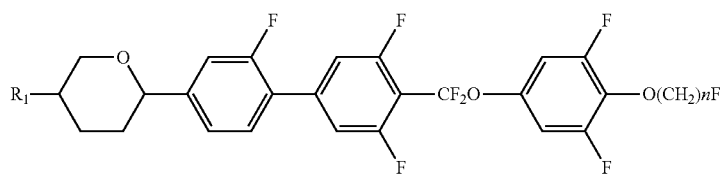
I57
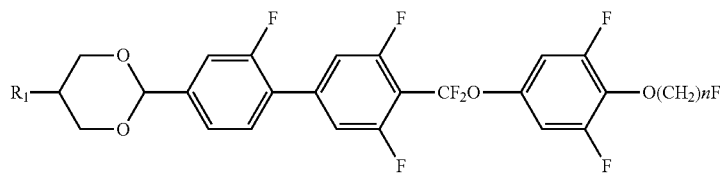
I58
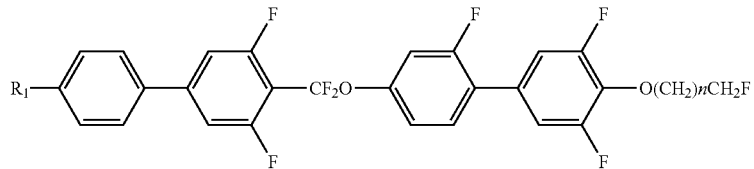
I59
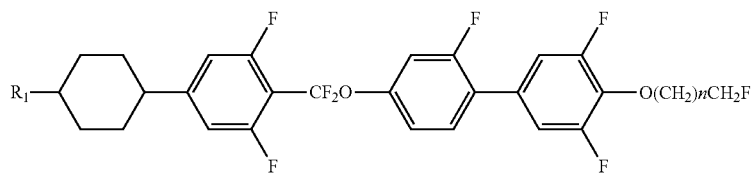
I60
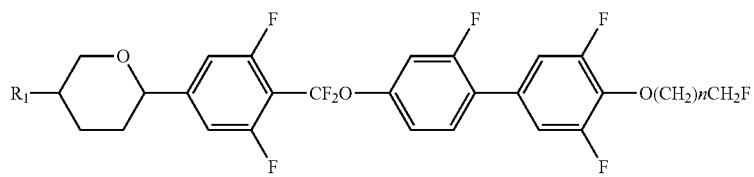
I61
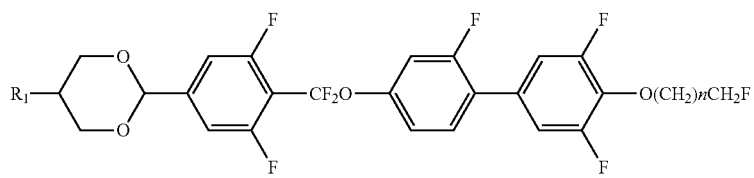
I62 wherein, $R_1$ is selected from alkyl or alkoxy group containing 1 to 6 carbon atoms, one or more $CH_2$ groups thereof being independently replaced by —CH=CH—, one or more hydrogen atom thereof being replaced by fluorine; n is 2, 3 or 4.

5. The liquid crystal composition according to claim 2, the composition comprising the compound represented by the general formal I is listed as follows:

I10-3
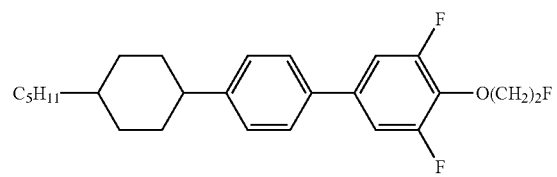
I10-4
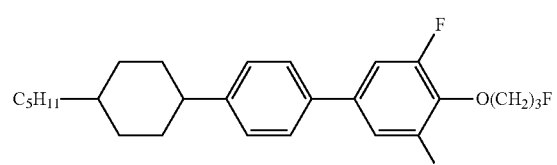
I10-4
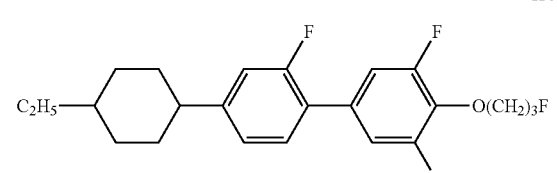
I11-1
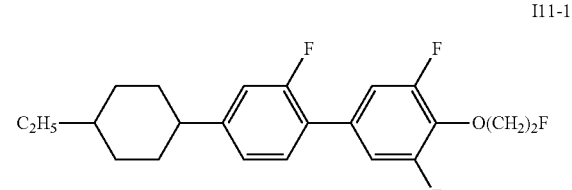
I11-2
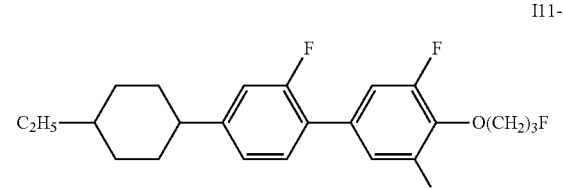
I11-3
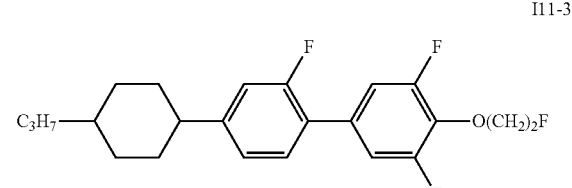
I11-4
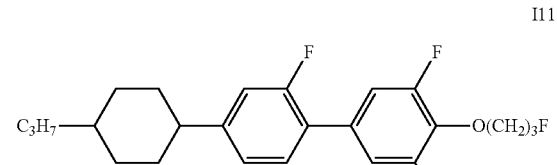
I16-1
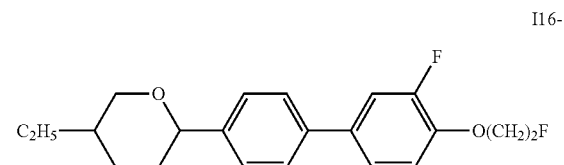
I16-2
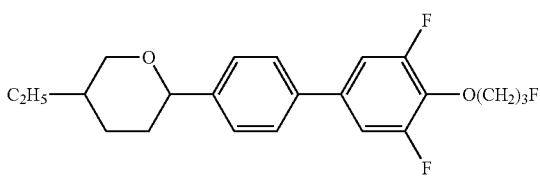
I16-3
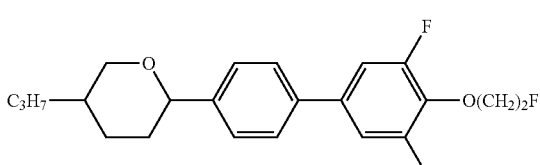
I16-4
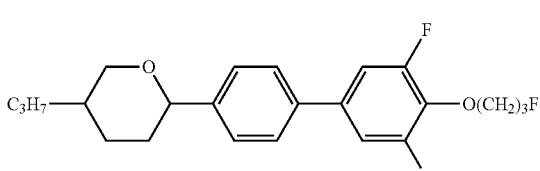
I16-5
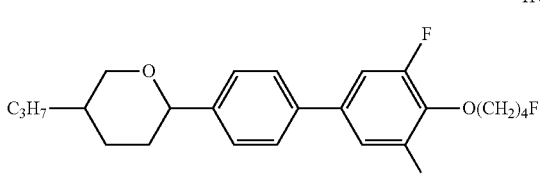
I17-1
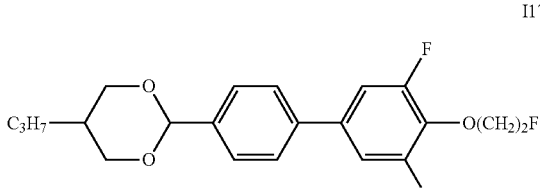
I17-2
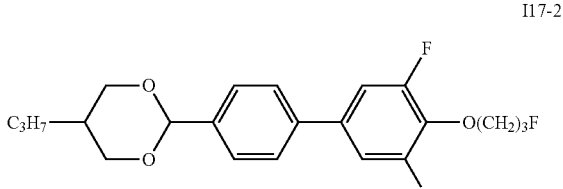
I17-3
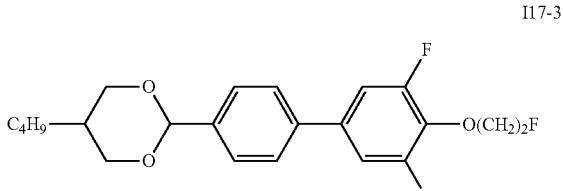
I17-4
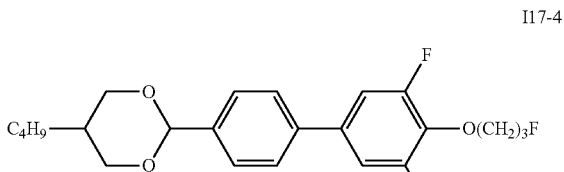

I24-1
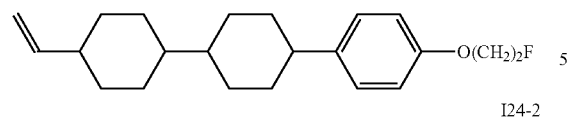
I24-2
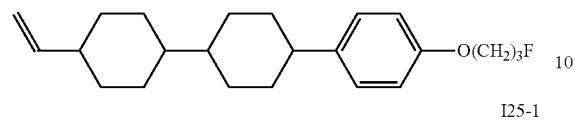
I25-1
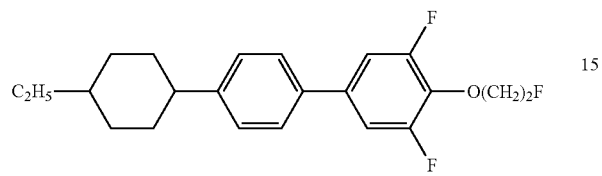
I25-2
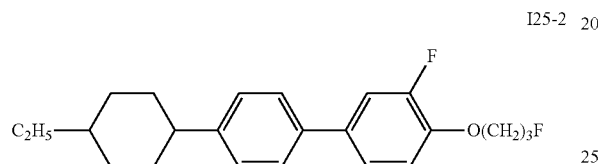
I25-3
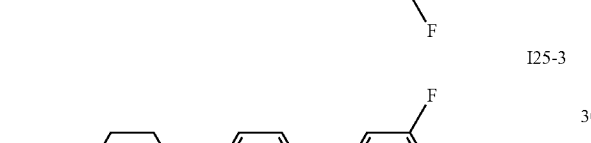
I25-4
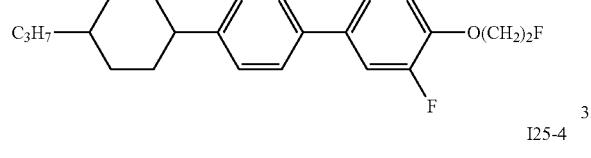
I29-1
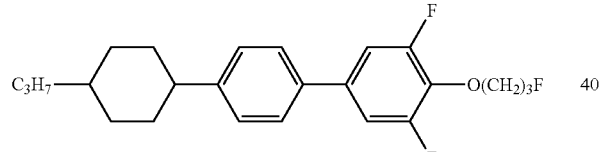
I29-2
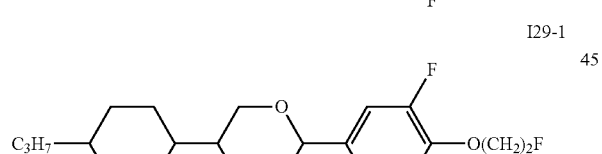
I32-1
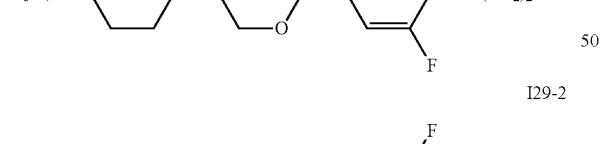
I32-2
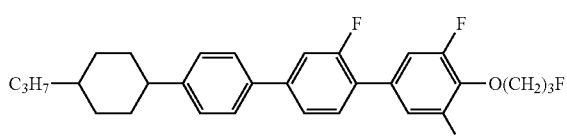
I33-1
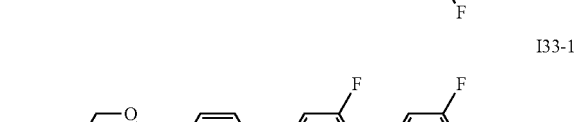
I33-2
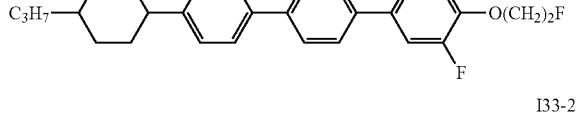
I34-1
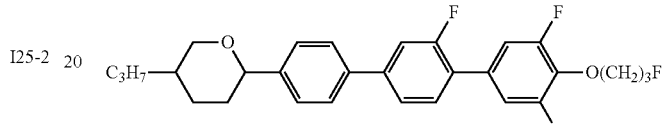
I34-2
I34-3
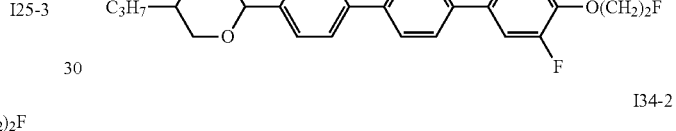
I34-4
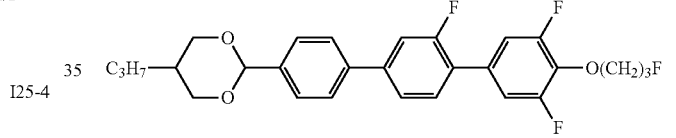
I35-1
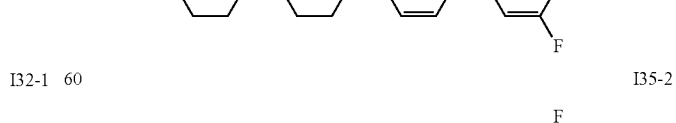
I35-2
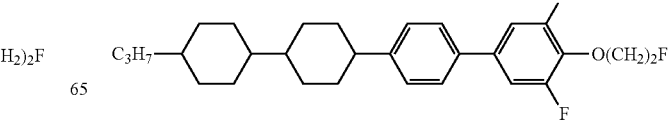

I35-3
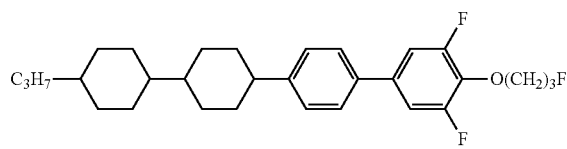
I35-4
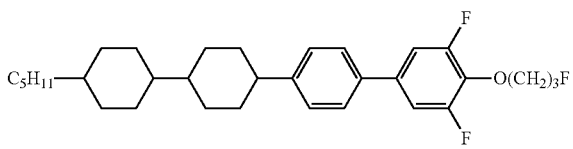
I40-1
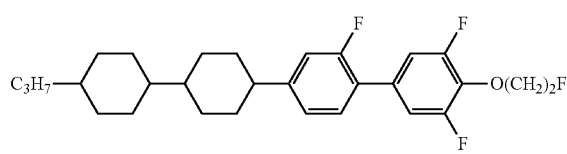
I40-2
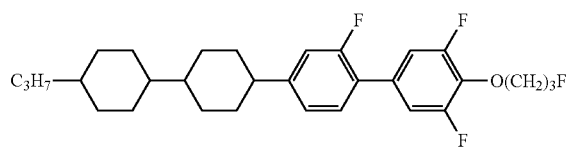
I39-1
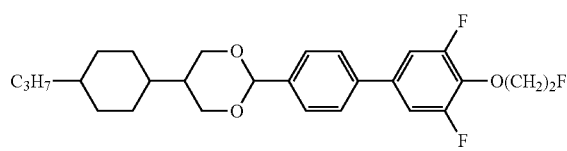
I39-2
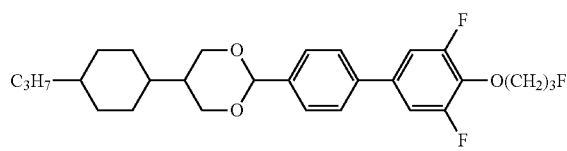
I48-1
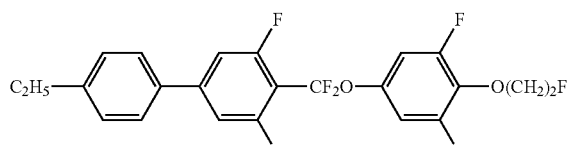
I48-2
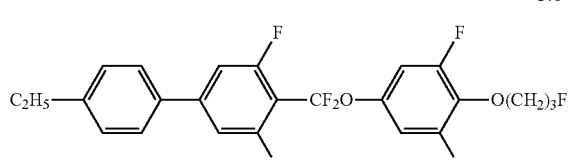
I48-3
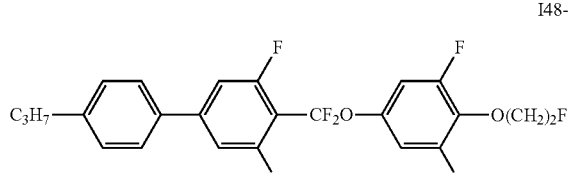
I48-4
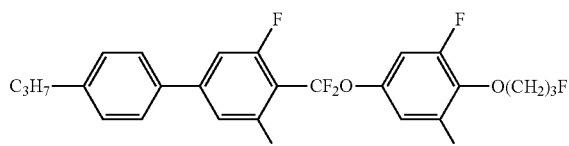
I48-5
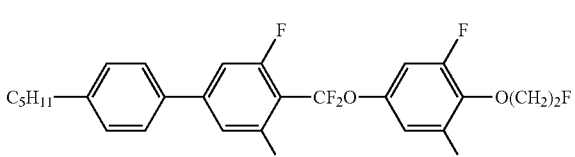
I48-6
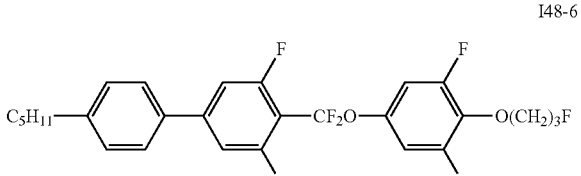
I51-1
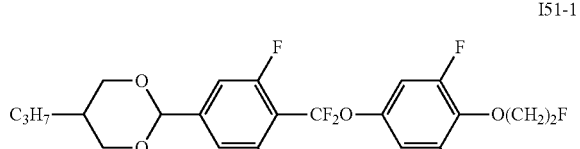
I51-2
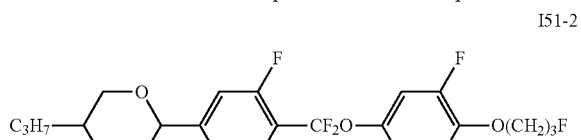
I51-3
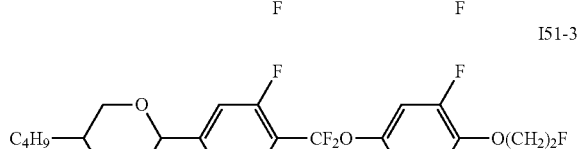
I51-4
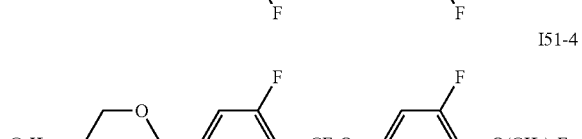
I52-1
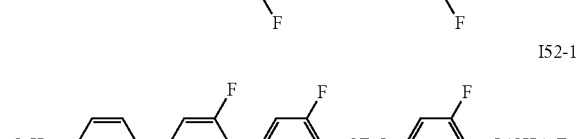
I52-2
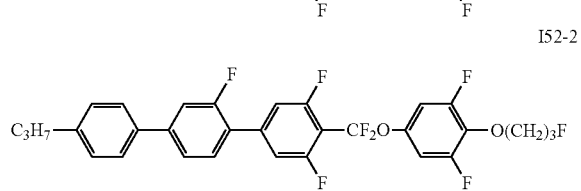

6. The composition according to claim 1, wherein the compound formula II and/or III are represented by at least one compound selected from the following:

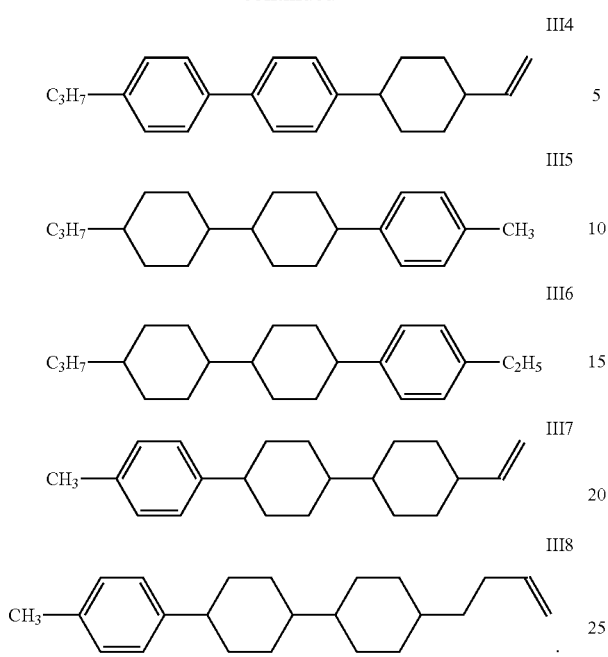
7. The composition according to claim 1, wherein the compound formula IV to XIII is represented by at least one compound selected from the following:
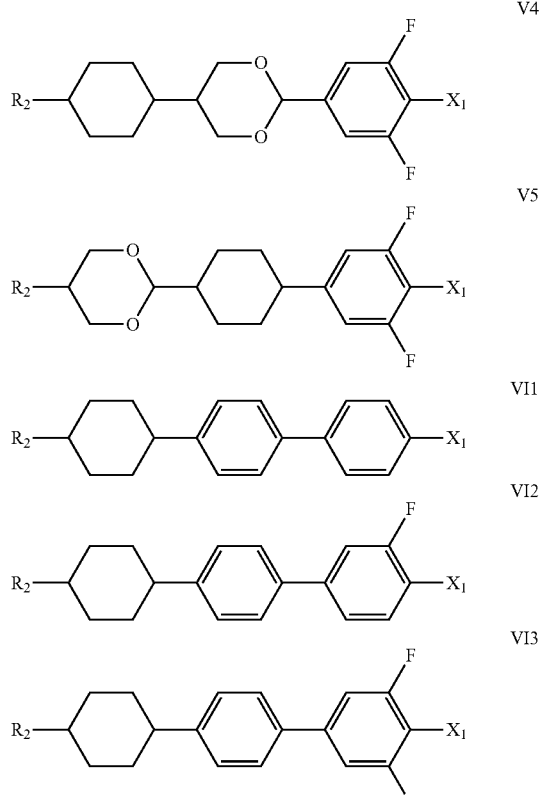
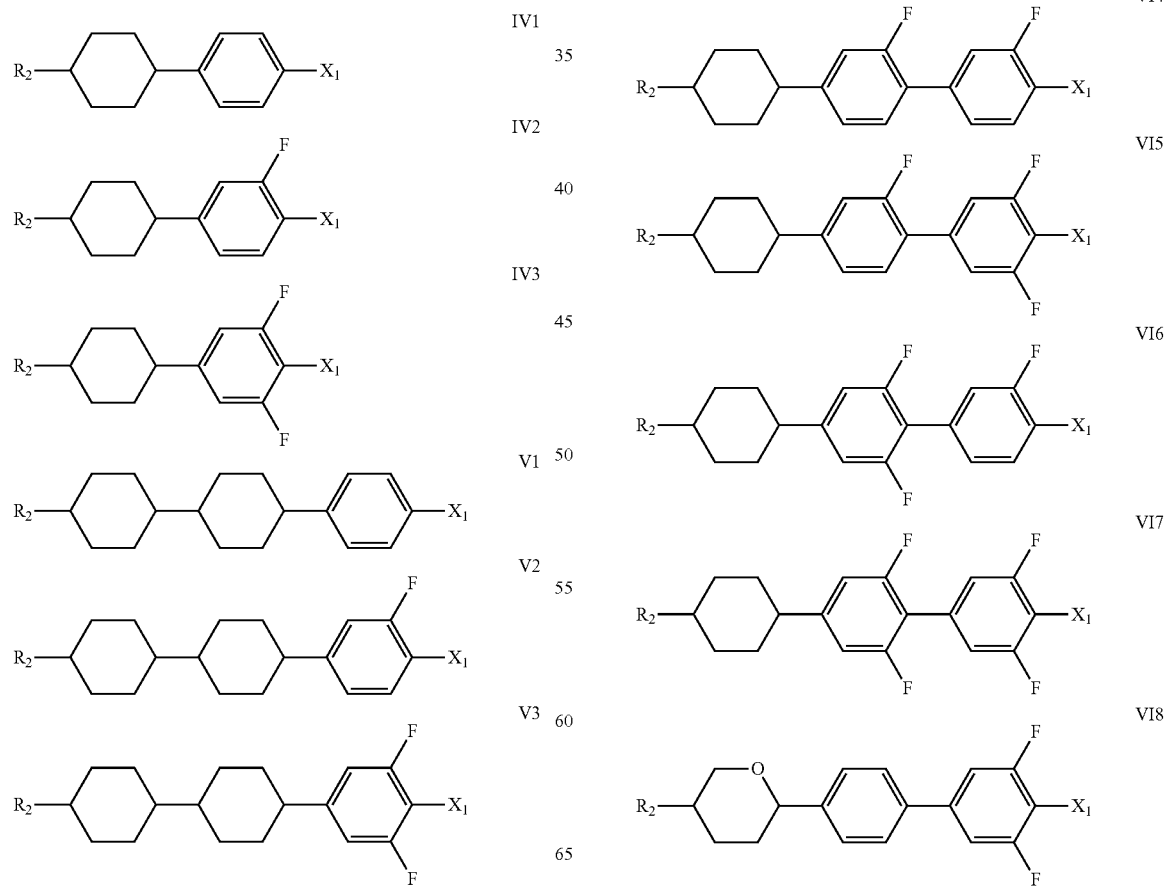

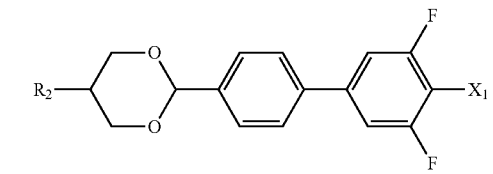 VI9
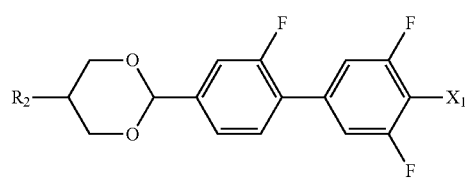 VI10
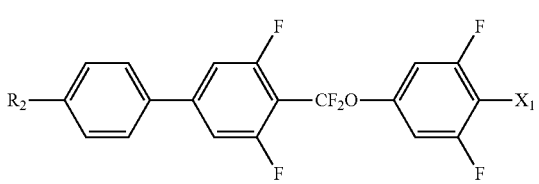 VII11
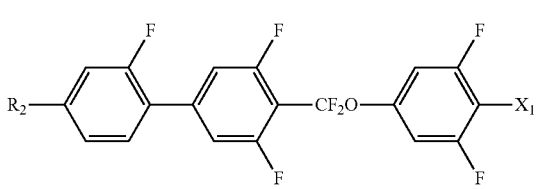 VII12
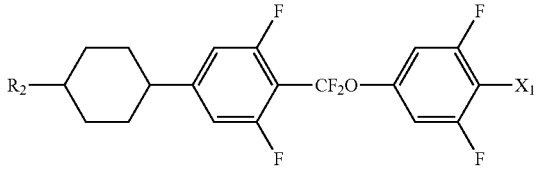 VIII1
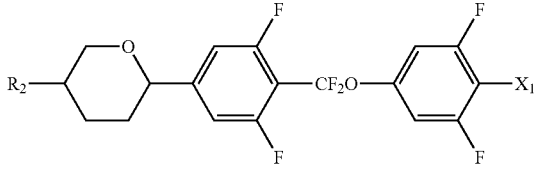 VIII2
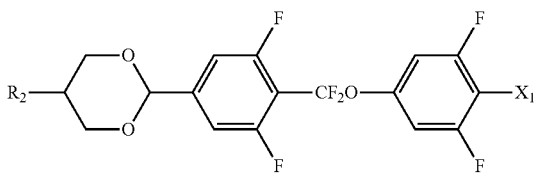 VIII3
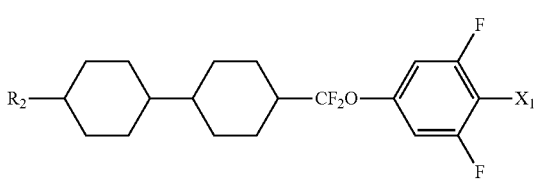 IX1
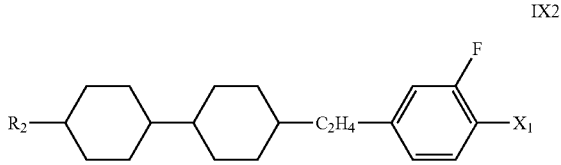 IX2
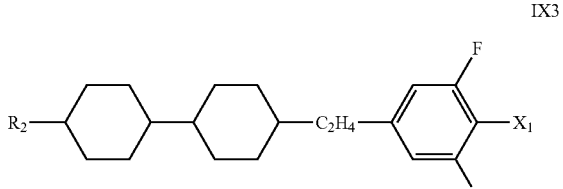 IX3
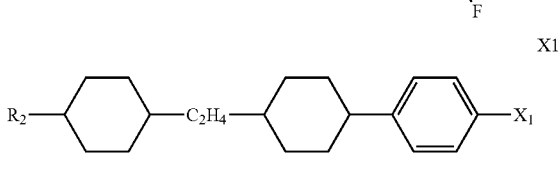 X1
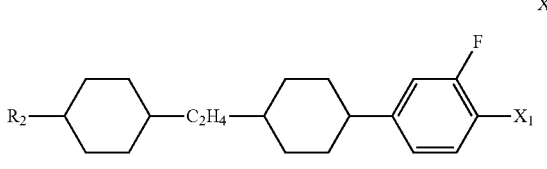 X2
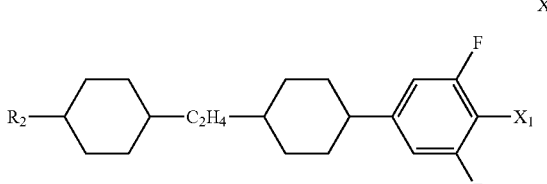 X3
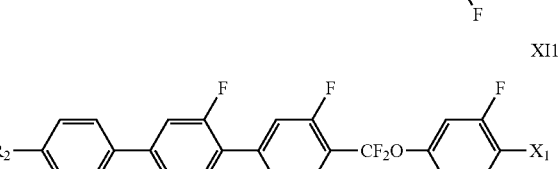 XI1
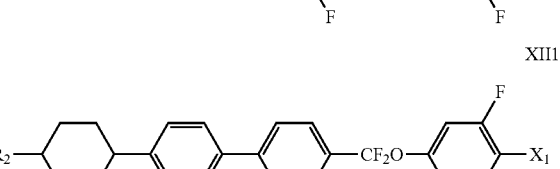 XII1
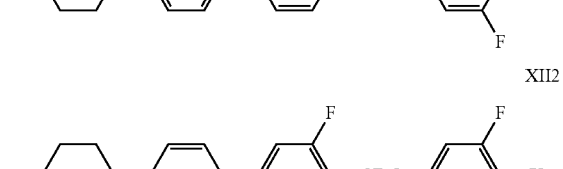 XII2
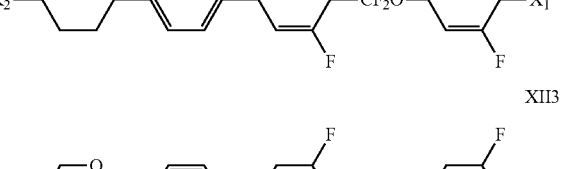 XII3

-continued

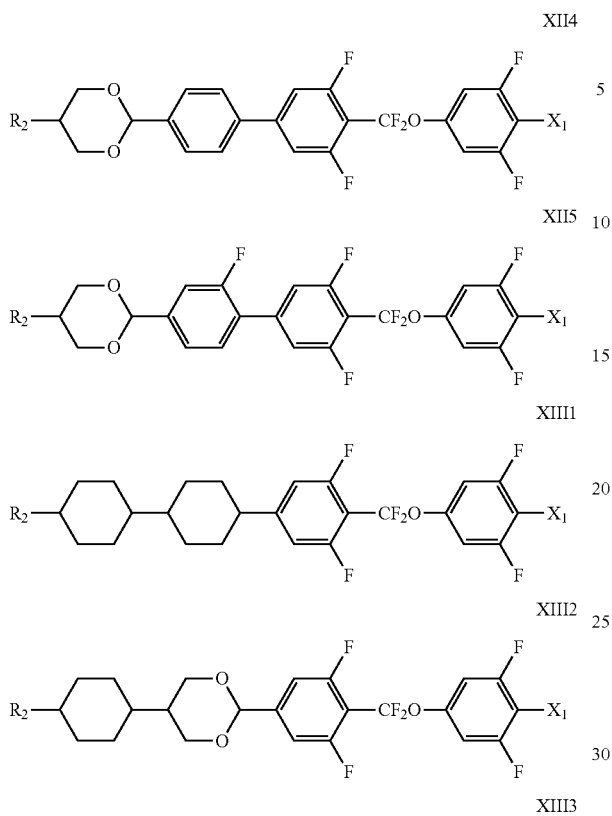

wherein, $R_2$ and $X_1$ denotes the same as in claim 1, $Y_1$-$Y_7$ each independently denote H or F.

8. The composition according to claim 1, wherein the compound of formula XIV to XVI is represented by at least one compound selected from the following:

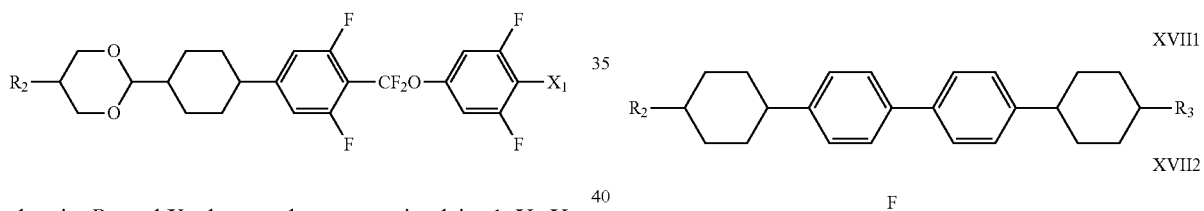

-continued

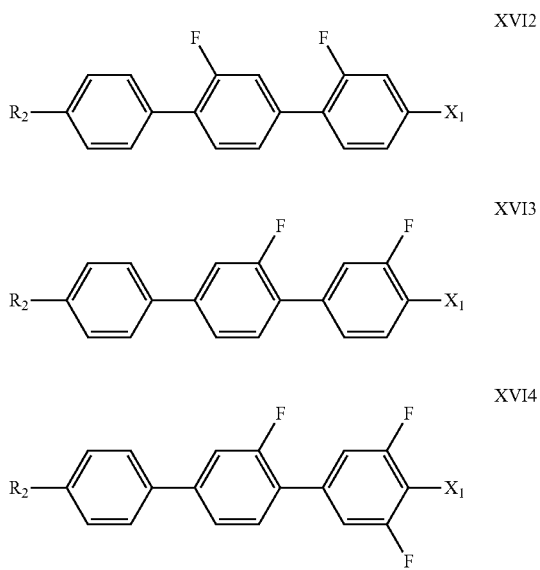

wherein, $R_2$, $R_3$, $Y_1$, $Y_2$ and $X_1$ represent the same as in claim 1 respectively.

9. The liquid crystal composition according to claim 1, wherein the compound of formula XVII to XXI is represented by at least one compound selected from the following:

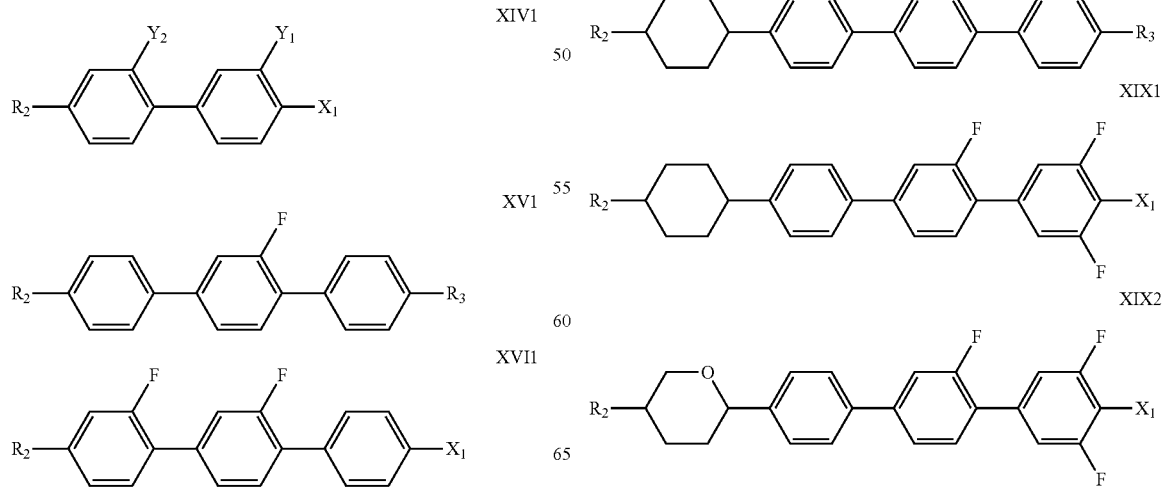

-continued

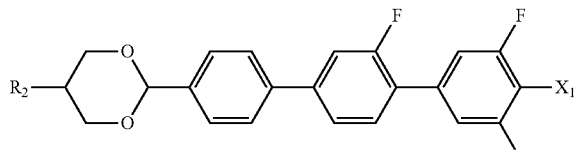
XIX3

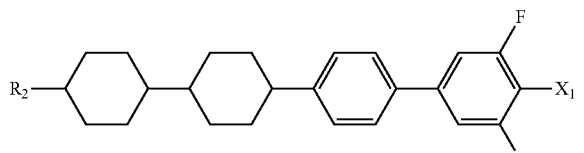
XX1

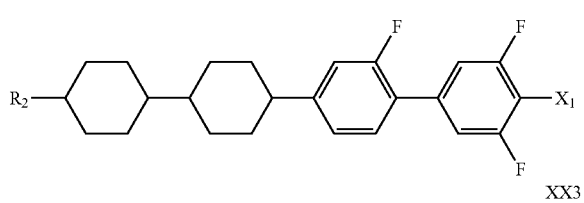
XX2

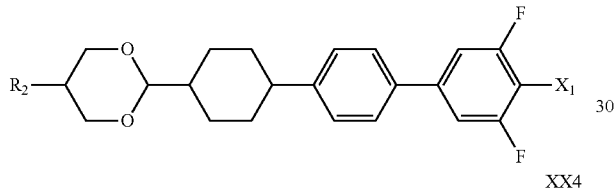
XX3

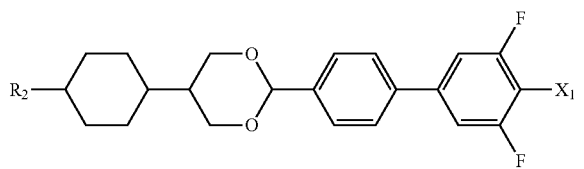
XX4

-continued

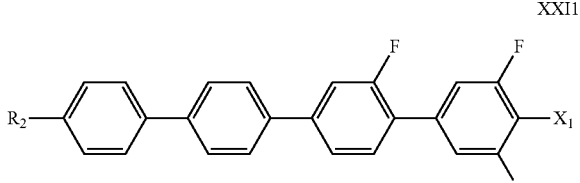
XXI1 wherein, $R_2$, $R_3$ and $X_1$ represent the same as in claim 1 respectively.

10. The liquid crystal composition according to claim 1, wherein the LCD device means TN, ADS, FFS or IPS display.

11. The liquid crystal composition according to claim 2, wherein the compound is represented by the general formula I, wherein:

R is selected from H and unsubstituted or substituted alkyl or alkoxy each containing 1 to 6 carbon atoms, one or more $CH_2$ groups thereof being each independently replaced by —CH=CH—, —O—, in a manner of not directly bonded to oxygen atoms, and one or more H atoms thereof being replaced by fluorine;

$A_1$, $A_2$, $A_3$, $A_4$ and $A_5$ are each independently selected from a single bond; 1,4-cyclohexylene; 1,4-cyclohexenyl; 1,4-phenylene; 1,4-cyclohexylene, one or two $CH_2$ nonadjacent thereof being replaced by oxygen; and one or more hydrogen thereof may independently be substituted by fluorine in each case; while $A_1$, $A_2$, $A_3$, $A_4$ and $A_5$ cannot be all a single bond;

$Z_1$, $Z_2$, $Z_3$ and $Z_4$ are each independently selected from: a single bond, —$(CH_2)_2$—, $CF_2O$;

n is 2, 3 or 4.

* * * * *